US012502892B2

(12) United States Patent
Okazaki et al.

(10) Patent No.: US 12,502,892 B2
(45) Date of Patent: Dec. 23, 2025

(54) LIQUID CONTAINMENT BOTTLE AND LIQUID SUPPLY APPARATUS

(71) Applicant: BROTHER KOGYO KABUSHIKI KAISHA, Nagoya (JP)

(72) Inventors: Naoya Okazaki, Hashima (JP); Satoru Oki, Nagoya (JP); Nanami Abe, Niigata (JP); Masahiro Hayashi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 135 days.

(21) Appl. No.: 17/823,187

(22) Filed: Aug. 30, 2022

(65) Prior Publication Data

US 2023/0063942 A1 Mar. 2, 2023

(30) Foreign Application Priority Data

Aug. 31, 2021 (JP) ................................ 2021-141980

(51) Int. Cl.
*B41J 2/175* (2006.01)

(52) U.S. Cl.
CPC ................................ *B41J 2/17553* (2013.01)

(58) Field of Classification Search
CPC ............................ B41J 2/17553; B65D 47/122
See application file for complete search history.

(56) References Cited

U.S. PATENT DOCUMENTS

| | | | |
|---|---|---|---|
| 8,708,470 | B1 | 4/2014 | Blowfield et al. |
| 10,369,800 | B2 | 8/2019 | Rooney et al. |
| 10,427,412 | B2 | 10/2019 | Okude et al. |
| 10,569,556 | B2 | 2/2020 | Ishizawa et al. |
| 10,752,003 | B2 | 8/2020 | Mizutani et al. |
| 11,052,668 | B2 | 7/2021 | Miyazawa et al. |
| 11,584,132 | B2 | 2/2023 | Nagai et al. |
| 11,673,405 | B2 | 6/2023 | Maruyama |
| 2003/0038865 | A1 | 2/2003 | Inamura |
| 2003/0197765 | A1 | 10/2003 | Dod et al. |
| 2010/0314350 | A1 | 12/2010 | Sewell |
| 2011/0197991 | A1 | 8/2011 | Ender et al. |

(Continued)

FOREIGN PATENT DOCUMENTS

| | | | |
|---|---|---|---|
| CN | 114771105 A * | 7/2022 | |
| JP | 56-133471 U | 2/1981 | |

(Continued)

OTHER PUBLICATIONS

Related U.S. Patent application as filed U.S. Appl. No. 17/823,143, filed Aug. 30, 2022.

(Continued)

*Primary Examiner* — Justin Seo
(74) *Attorney, Agent, or Firm* — Merchant & Gould P.C.

(57) ABSTRACT

A liquid containment bottle includes a bottle body having an internal space configured to contain liquid. The bottle body has: an upper surface, a nozzle having a forward end surface projecting upward from the upper surface, the nozzle having an opening formed in the forward end surface, and a circular wall which is positioned in a surrounding of the nozzle with a spacing distance from the nozzle, and which projects upward from the upper surface. An upper end of the circular wall is positioned above the forward end surface of the nozzle.

7 Claims, 11 Drawing Sheets

(56) References Cited

U.S. PATENT DOCUMENTS

| | | | |
|---|---|---|---|
| 2014/0104349 A1 | 4/2014 | Kimura et al. | |
| 2017/0355191 A1 | 12/2017 | Mizutani et al. | |
| 2017/0355194 A1 | 12/2017 | Fukasawa et al. | |
| 2018/0207939 A1 | 7/2018 | Ishizawa et al. | |
| 2019/0030903 A1 | 1/2019 | Fukaswa et al. | |
| 2019/0039381 A1 | 2/2019 | Ishizawa et al. | |
| 2019/0163091 A1 | 5/2019 | Koshikawa et al. | |
| 2019/0299624 A1 | 10/2019 | Mizutani et al. | |
| 2020/0307224 A1 | 10/2020 | Ohara et al. | |
| 2020/0316949 A1 | 10/2020 | Shimada | |
| 2021/0129552 A1 | 5/2021 | Maruyama | |
| 2022/0016893 A1* | 1/2022 | Nagai | B41J 2/17509 |
| 2022/0016894 A1 | 1/2022 | Nagaoka et al. | |

FOREIGN PATENT DOCUMENTS

| | | | |
|---|---|---|---|
| JP | 2003-53996 | A | 2/2003 |
| JP | 2004-338131 | A | 12/2004 |
| JP | 2017-222152 | A | 12/2017 |
| JP | 2018-62372 | A | 4/2018 |
| JP | 2018-75729 | A | 5/2018 |
| JP | 2018-134830 | A | 8/2018 |
| JP | 2018-140613 | A | 9/2018 |
| JP | 2019-25782 | A | 2/2019 |
| JP | 2019-25862 | A | 2/2019 |
| JP | 2019-93669 | A | 6/2019 |
| JP | 2020-168790 | A | 10/2020 |
| JP | 2020-168823 | A | 10/2020 |
| JP | 2021-70256 | A | 5/2021 |
| JP | 2022-18712 | A | 1/2022 |
| JP | 2022-18869 | A | 1/2022 |
| KR | 10-2005-83509 | A | 8/2005 |

OTHER PUBLICATIONS

Related U.S. Patent application as filed U.S. Appl. No. 17/823,140, filed Aug. 30, 2022.

Related U.S. Patent application as filed U.S. Appl. No. 17/823,163, filed Aug. 30, 2022.

Related U.S. Patent application as filed U.S. Appl. No. 17/823, 170, filed Aug. 30, 2022.

Non-Final Office Action issued in corresponding U.S. Appl. No. 17/823,140, Mar. 5, 2024.

Non-Final Office Action issued in the related U.S. Appl. No. 17/823,170, Apr. 1, 2024.

Non-Final Office Action issued in the related U.S. Appl. No. 17/823,163, Apr. 24, 2024.

Notice of Allowance issued in the corresponding U.S. Appl. No. 17/823,143, Dec. 4, 2024.

Notice of Allowance issued in the corresponding U.S. Appl. No. 17/823,140, Sep. 18, 2024.

Notice of Allowance issued in the corresponding U.S. Appl. No. 17/823,163, Dec. 4, 2024.

Notice of Allowance issued in the corresponding U.S. Appl. No. 17/823,170, Nov. 25, 2024.

Final Office Action issued in the corresponding U.S. Appl. No. 17/823,170, Aug. 15, 2024.

Notice of Allowance issued in corresponding U.S. Appl. No. 17/823,143, Jan. 15, 2025.

Notice of Allowance issued in corresponding U.S. Appl. No. 17/823,163, Jan. 15, 2025.

* cited by examiner

LIQUID CONTAINMENT BOTTLE AND LIQUID SUPPLY APPARATUS

REFERENCE TO RELATED APPLICATIONS

This application claims priority from Japanese Patent Application No. 2021-141980 filed on Aug. 31, 2021. The entire content of the priority application is incorporated herein by reference.

BACKGROUND ART

There is a known ink supply apparatus wherein an ink is supplied to a tank from a bottle in a so-called chicken feed system, as a configuration capable of maintaining a liquid surface of the ink contained in the tank to be constant, by supplying the ink successively to the tank from a bottle connected to the tank every time the ink contained in the tank is consumed.

In this ink supply apparatus, the bottle is connected to the tank from thereabove. The tank is provided with an air introducing part communicating with the atmosphere. The bottle is provided with an ink outflow pipe and an air inflow pipe. In a state that the bottle is connected to the tank, the bottle and the tank are communicated with each other via the ink outflow pipe and the air inflow pipe. In a case that the ink inside the tank is consumed and that the liquid surface of the ink becomes to be lower than a forward end part of the air inflow pipe, the air enters from the air introducing part into the tank, and the air entered into the tank enters into the bottle via the air inflow pipe. Then, the ink of which amount corresponds to the volume of the air entered into the bottle is supplied from the bottle to the tank, via the ink outflow pipe. In a case that the liquid surface of the ink reaches the forward end part of the air inflow pipe, the supply of the ink is stopped. In such a manner, the liquid surface of the ink inside the tank is maintained to be constant.

DESCRIPTION

In a case that the bottle is inclined when the ink is being supplied from the bottle to the tank, there is such a fear that the ink might drip down from the ink outflow pipe. Further, there is such a fear that the dripped ink might dirty the desk, etc.

The present disclosure has been made in view of the circumstances described above, and an object of the present disclosure is to provide a liquid containment bottle wherein a liquid is less likely to drip down from the body of the bottle.

According to a first aspect of the present disclosure, there is provided a liquid containment bottle. The liquid containment bottle includes a bottle body defining an internal space configured to contain liquid. The bottle body has: an upper surface; a nozzle having a forward end surface projecting upward from the upper surface, the nozzle having an opening formed in the forward end surface; and a circular wall which is positioned in a surrounding of the nozzle with a spacing distance from the nozzle, and which projects upward from the upper surface. An upper end of the circular wall is positioned above the forward end surface.

In a case that the bottle body is inclined upside down, the liquid dripping down from the forward end surface of the nozzle is easily received by the circular wall.

The circular wall may have a cylindrical shape and the circular wall may include a curved plate and a connecting plate which are connected to each other and each of which is a part in a circumferential direction of the cylindrical shape.

It is possible to easily grasp the position in the circumferential direction of the bottle body, with the connecting plate as a reference.

The liquid containment bottle may be configured to supply the liquid to a tank of a liquid consuming apparatus. The liquid containment bottle may further have a key member which is formed in the circular wall, and the key member may be configured to conform to a receiver key member provided on a surrounding of a supply port of the tank.

By changing at least one of the position, length, height and number (quantity) of the key member per each kind of the liquid containment bottle, it is possible to grasp the kind of the liquid containment bottle by the key member.

The liquid containment bottle may further include a cap configured to be attached to the bottle body. The nozzle may have: a seat surface located at a position which is closer to the circular wall than the forward end surface in a radial direction of the nozzle, and which is closer to the internal space than the forward end surface in an up-down direction; and a groove which is formed in the seat surface and which has an end part connected to a space between the nozzle and the circular wall. The cap may have: a sealing part configured to seal the opening in an attached state in which the cap is attached to the bottle body; and a projecting piece which projects from a surrounding of the sealing part and which is configured to make contact with the seat surface in the attached state.

Since the liquid flows out from the seat surface, via the groove, into the space between the nozzle and the circular wall, the liquid is less likely to remain in the seat surface. As a result, the liquid is less likely to adhere to the projecting piece making contact with the seat surface, which in turn make the liquid to less likely to drip down from the cap detached from the bottle body.

The nozzle may have a nozzle upper part which is positioned above the seat surface and which has a cylindrical shape. The seat surface may have a ring shape oriented upward. The projecting piece may have a cylindrical shape.

Since the nozzle upper part and the projecting pieces are fitted to each other, the cap is easily attached to the bottle body.

The groove may have a bottom surface which is inclined downward toward the internal space.

The liquid is easily introduced downward from the seat surface via the groove.

The cap may be configured to be screwed with respect to the circular wall and to be attached to the bottle body.

It is possible to attach the cap to the bottle body easily and in an ensured manner.

According to a second aspect of the present disclosure, there is provided a liquid supply apparatus including: the liquid containment bottle according to the first aspect; and a tank having a containment chamber configured to contain liquid. The tank has: a recessed part; and a communicating tube which is positioned in the recessed part. The communicating tube has a first channel and a second channel which are configured to communicate the containment chamber with outside. The circular wall is configured to be inserted into the recessed part and the communicating tube is configured to be inserted into the opening of the nozzle, to thereby connect the bottle body to the tank and to allow the liquid to flow out from the internal space of the bottle body to the containment chamber of the tank.

According to the present disclosure, the liquid is less likely to drip down from the bottle body.

Figure 1A:
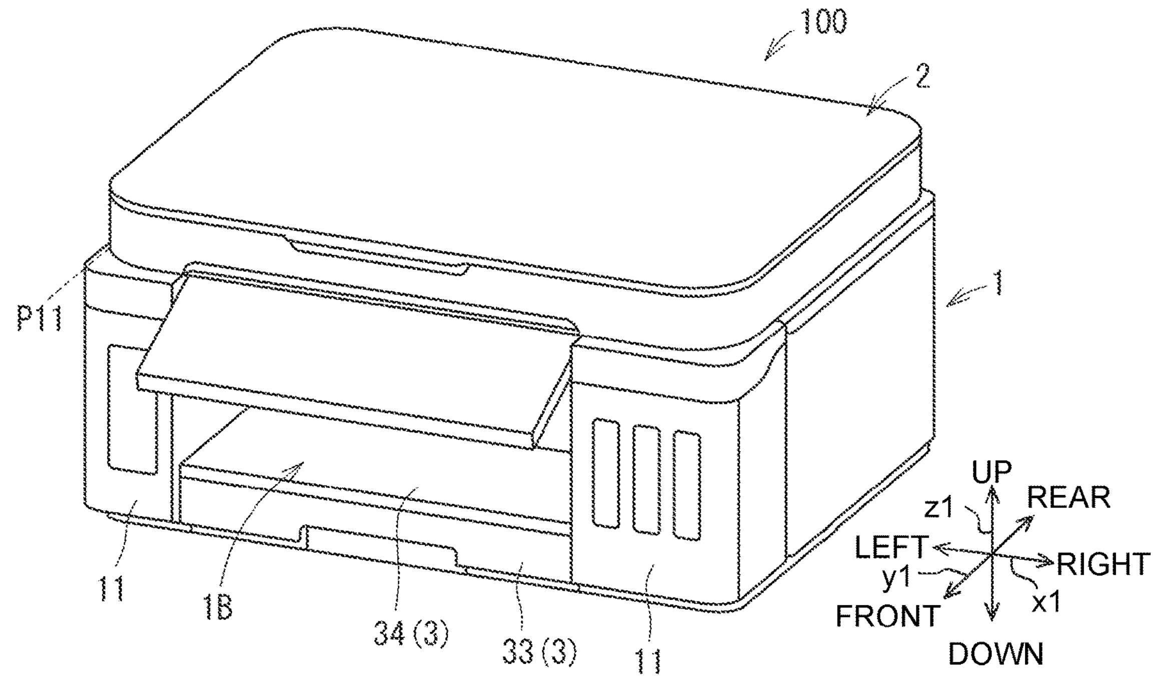
FIG. 1A is a perspective view depicting the outer appearance of a MFP (Multi-Functional Peripheral) in a case that a casing cover is at a shielding position.

In the following, an embodiment of the present disclosure will be described. Note that the embodiment which is to be explained below is merely an example of the present disclosure; it is needless to say that the embodiment can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". In other words, an orientation is a component of the direction. Furthermore, an up-down direction z1 is defined, with a posture in which a MFP 100 is installed usably in a horizontal plane (a posture of FIG. 1, also referred to as a "usage posture"), as the reference; a front-rear direction y1 is defined, with a side on which a discharge port 1B of the MFP 100 is provided is defined as a front side (front surface); and a left-right direction x1 is defined, with the MFP 100 as seen from the front side (front surface). In the present embodiment, in the usage posture, the up-down direction z1 is the vertical direction, the front-rear direction y1 and the left-right direction x1 are parallel to the horizontal plane, and the front-rear direction y1 and the left-right direction x1 are orthogonal to each other.

[Configuration of MFP 100]

In FIG. 1, the MFP 100 is a multi-functional peripheral, and is provided with a casing 1, a casing cover 2 and a printer part 3. The MFP 100 is an example of a "liquid consuming apparatus" and is a part of a liquid supply apparatus.

The casing 1 has a substantially rectangular parallelepiped shape and partitions an internal space 1A (see FIG. 1B) of the MFP 100 from the outside. An upper end of the internal space 1A is an opening which is oriented upward. An opening 1B which is oriented frontward is formed in the front surface 11 of the casing 1, at a location in the vicinity to the center in the left-right direction x1. The opening 1B has a rectangular shape as seen in a plan view from the front (hereinafter also referred to as a "first front view"), and is communicated with the internal space 1A.

The casing cover 2 is coupled or linked to the casing 1, at a location in the vicinity to an upper rear corner of the casing 1, with a coupling tool 21 (see FIG. 1B); the casing cover 2 rotates or pivots between a shielding position P11 (see FIG. 1A) and an exposing position P12 (see FIG. 1B) about the rotation axis of the coupling tool 21. At the shielding position P11, the casing cover 2 shields constituent components (see FIG. 1B) in the internal space 1A. The constituent components include a tank set 31, a recording part 32, etc. At the exposing position P12, the casing cover 2 exposes these constituent components to the outside.

The casing cover 2 may accommodate, in the inside thereof, a scanner part configured to optically read a manuscript (original). Other than this, the MFP 100 may have a facsimile function, etc.

Figure 1B:
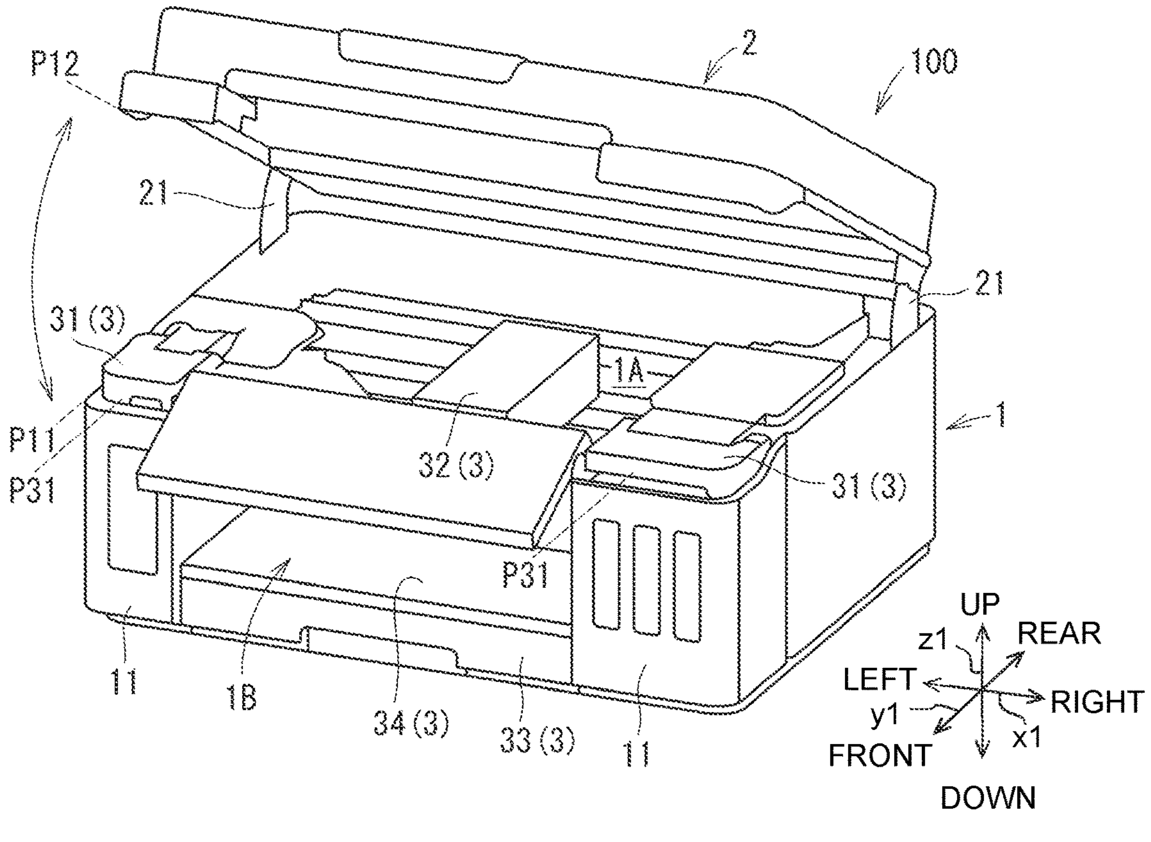
FIG. 1B is a perspective view depicting the outer appearance of the MFP in a case that the casing cover is at an exposing position.
Figure 2:
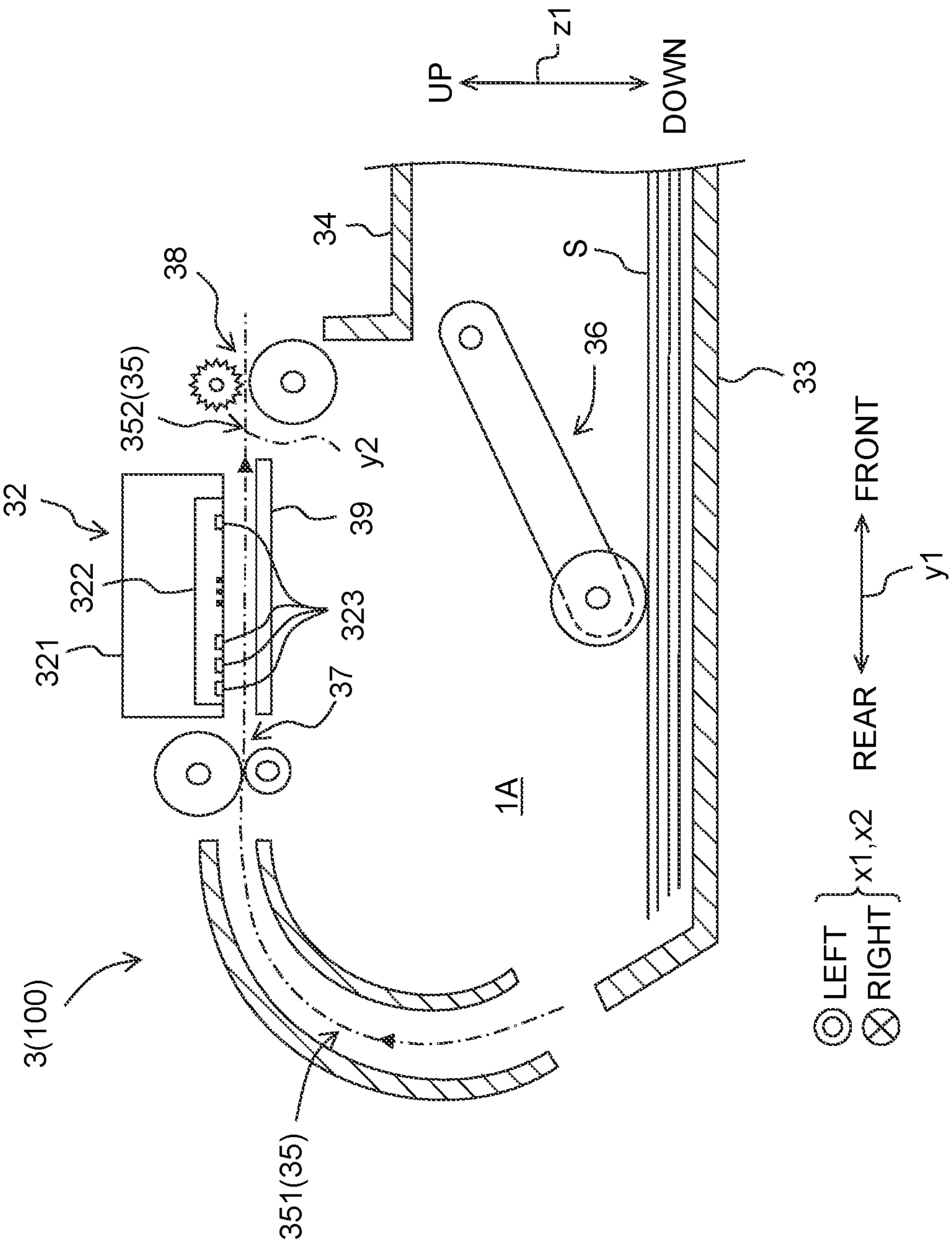
FIG. 2 is a vertical cross-sectional view schematically depicting the internal structure of a printer part.

In FIG. 2, other than the tank set 31 and the recording part 32 (see FIG. 1B), the printer part 3 is provided with, in the internal space 1A, a supply tray 33, a discharge tray 34, a conveying route 35, a feeding roller part 36, a conveying roller part 37, a discharging roller part 38 and a platen 39, and records an image on a sheet S (paper sheet S, paper S; see FIG. 2) in the ink-jet recording system.

The supply tray 33 and the discharge tray 34 are installed in the internal space 1A via the opening 1B (see FIGS. 1A and 1B). A plurality of pieces of the sheet S are stacked in the supply tray 33. The discharge tray 34 is positioned above the supply tray 33, and supports a sheet S on which an image is recorded. The conveying route 35 is indicated in FIG. 2 by an arrow of a one-dot chain line, and has a curve part 351 and a straight line (linear) part 352. The curved part 351 makes a U-turn frontward while extending upward from a rear end of the supply tray 33. The straight line part 352 extends frontward linearly from a downstream end of the curved part 351 and reaches a rear end of the discharge tray 34.

The feeding roller part 36 feeds, one by one, the sheets S on the supply tray 33 to an upstream end of the curved part 351. The conveying roller part 37 is located at a downstream end of the curved part 351, and feeds the sheet S conveyed by the curved part 351 toward the straight line part 352 in a conveying orientation y2. The conveying orientation y2 is frontward in the straight line part 352. The discharging roller part 38 is located immediately behind (on the rear side) of the discharge tray 34 in the straight line part 352, and discharges the sheet S conveyed in the straight line part 352 to the discharge tray 34.

The platen 39 is positioned, in the straight line part 352, between the conveying roller part 37 and the discharging roller part 38, and supports the sheet S, which is fed out from the conveying roller part 37, from therebelow. The recording part 32 is positioned above the platen 39, and is provided with a carriage 321 and a recording head 322. The carriage 321 moves in a reciprocal manner in a main scanning direction x2 which is parallel to the left-right direction x1. The recording head 322 is mounted on the carriage 321 so that a lower surface of the recording head 322 faces or is opposite to an upper surface of the platen 39, via the straight line part 352. A plurality of nozzles 323 are aligned, in the front-rear direction y1 and the left-right direction x1, in the lower surface of the recording head 322. The recording head 322 discharges or ejects inks of four colors (four color inks) stored inside the recording head 322, from the plurality of nozzles 323. The four colors are Y color (yellow), M color (magenta), C color (cyan) and K color (black). The recording head 322 discharges the ink(s) from the plurality of nozzles 323 toward the sheet S stopped on the platen 39, while moving together with the carriage 321 in the main scanning direction x2 at a constant speed. With this, an image corresponding to one pass is recorded on the sheet S. In a case that recording of the image corresponding to one pass is ended, the sheet S is conveyed in the conveying orientation y2 by a width corresponding to a unit line feed by an intermittent conveyance by the conveying roller part 37. This image recording and the intermittent conveyance are alternately repeated to thereby record an image on the entirety of the sheet S.

[Tank Set 31]

Figure 3A:
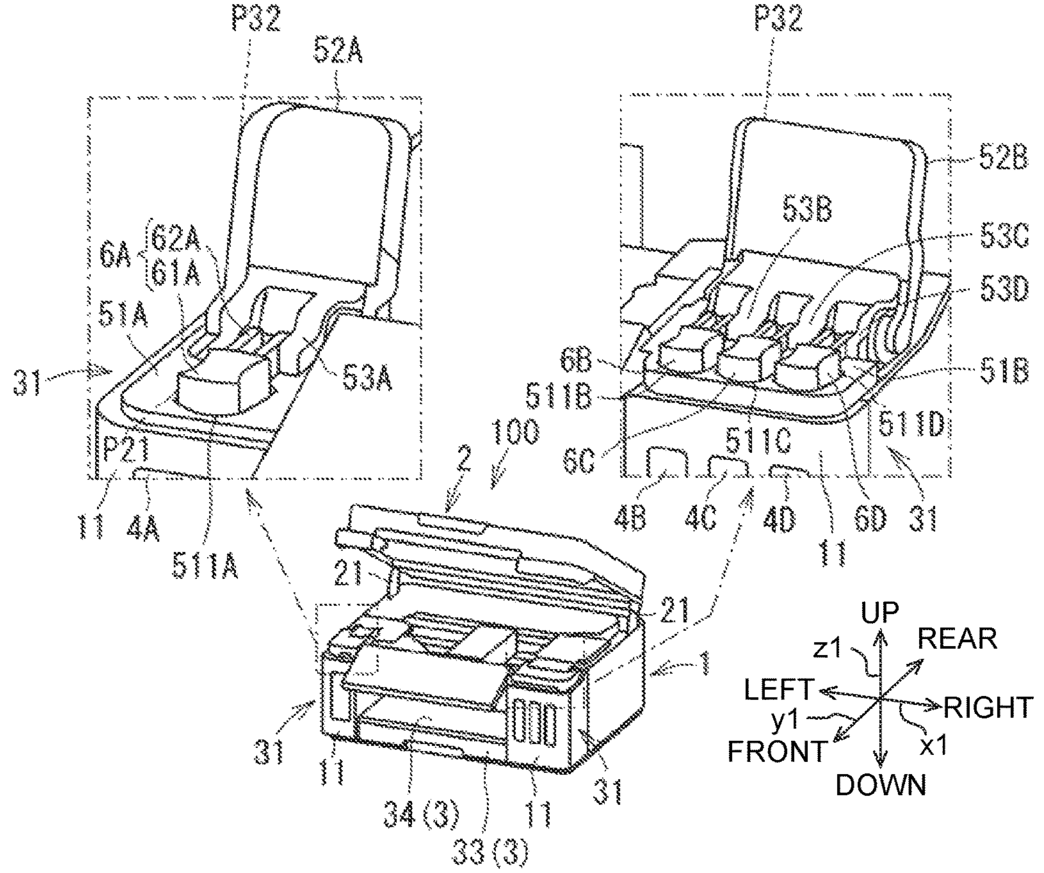
FIG. 3A is a perspective view of a tank set in a case that caps are each at a closing position.
Figure 3B:
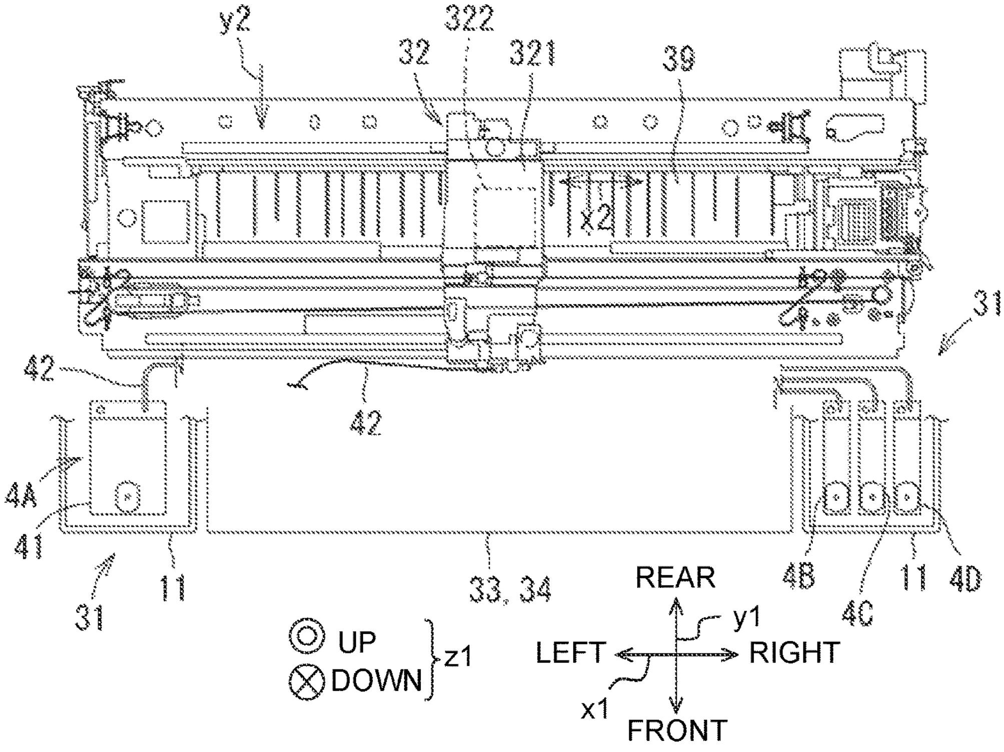
FIG. 3B is a plan view schematically depicting the tank set, a recording part and the peripheral structure of the recording part.

In FIGS. 3A and 3B, the tank set 31 is provided with four tanks 4A to 4D, two holding members 51A and 51B, four caps 6A to 6D, and two tank covers 52A and 52B. In FIG. 3B, the holding members 51A and 51B, the caps 6A to 6D and the tank covers 52A and 52B are not illustrated.

The tanks 4A to 4D are installed at a location immediately behind the front surface 11. The tank 4A is positioned on the left side with respect to the supply tray 33. The tanks 4B to 4D are positioned on the right side with respect to the supply tray 33, and are arranged side by side from the left to the right, in an order of the tank 4B, the tank 4C and the tank 4D.

[Tank 4A]

In FIG. 3B, the tank 4A is an example of a "tank", and is provided with a body 41. The body 41 has a substantially rectangular parallelepiped shape of which size in the left-right direction x1 is smaller than a size thereof in the up-down direction z1 and a size thereof in the front-rear direction y1. The body 41 partitions a containment chamber 46 (see FIG. 4B) configured to store the ink of the K color from the outside. The body 41 is formed of an injection molding of a resin material having a light-translucency, etc., except for a side surface, of the body 41, on one side in the left-right direction x1 thereof. The side surface on the one side in the left-right direction x1 is closed or sealed by a resin film which is thinner than other parts different from the side surface on the one side in the left-right direction x1.

As depicted in FIG. 3B, one end of one of tubes 42 made of a flexible resin is connected to a location, of the body 41, in the vicinity of the rear end of the body 41. The other end of one of the respective tubes 42 is connected to the recording head 322. In accordance with consumption of the ink inside the recording head 322, the ink inside the body 41 is supplied to the recording head 322 via one of the tubes 42. An atmosphere communicating hole is also formed at a location, of the body 41, in the vicinity of the rear end of the body 41.

Figure 4A:
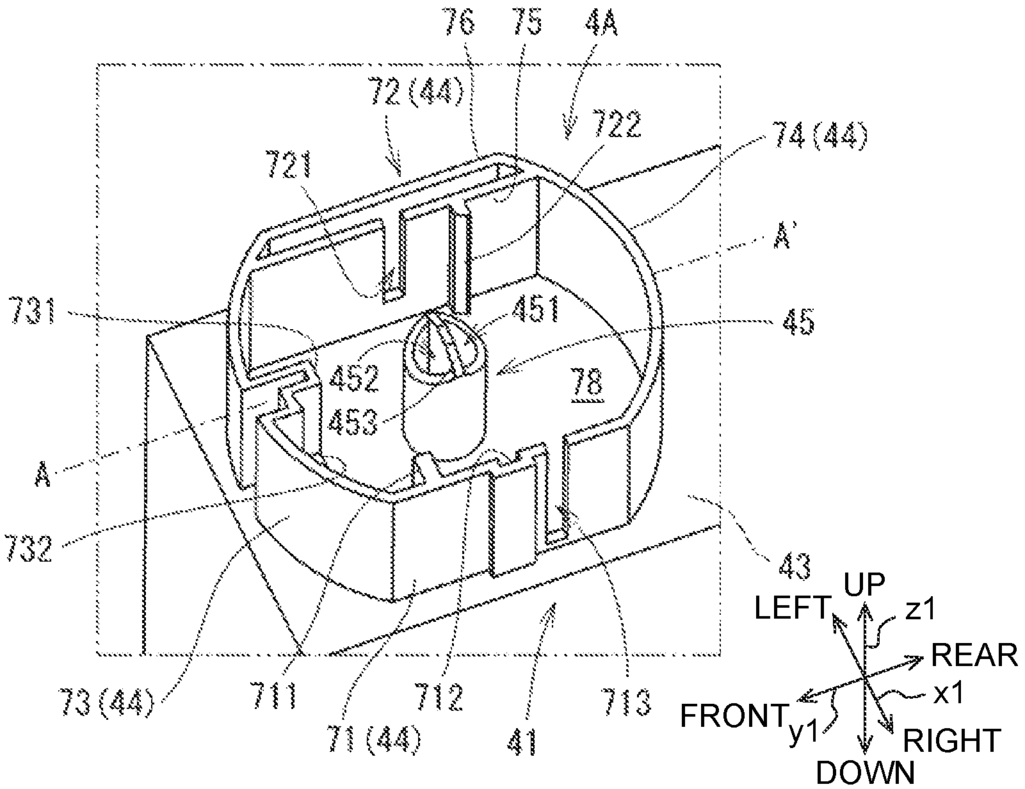
FIG. 4A is a perspective view of a circular wall and a needle provided on a body.
Figure 4B:
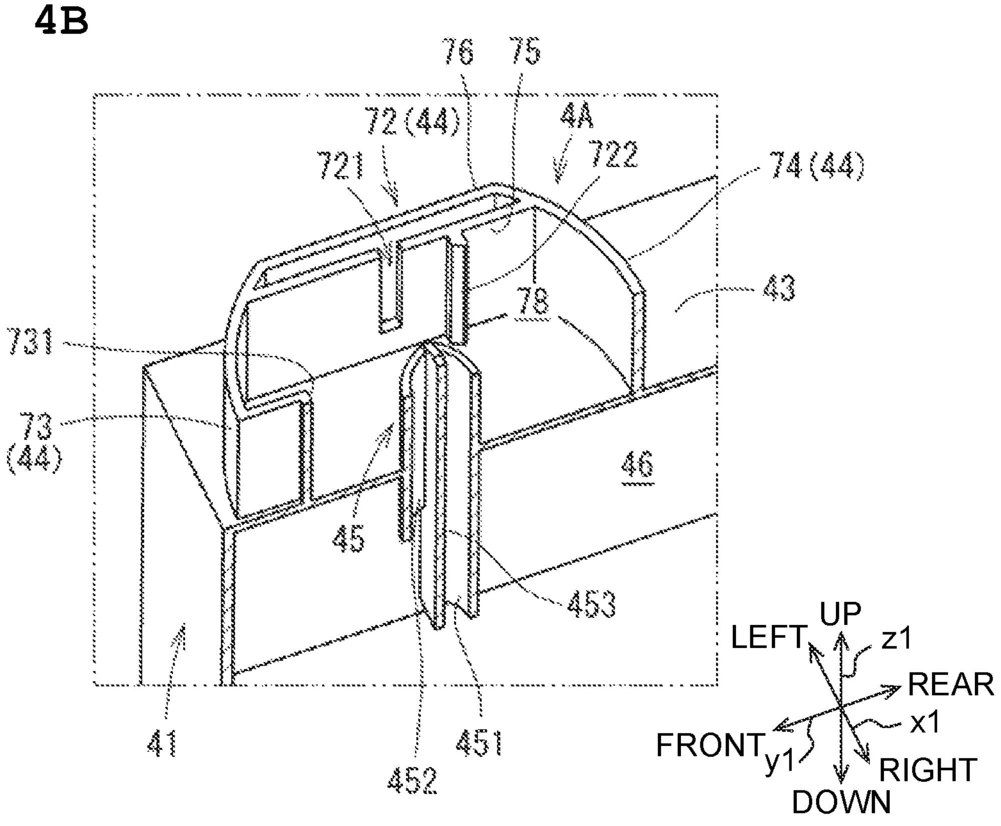
FIG. 4B is a cross-sectional view of a vertical cross section as seen from the right side of the body, along a one-dot chain line A-A' of FIG. 4A.

In FIGS. 4A and 4B, a circular wall 44 and a needle 45 extend upward from an upper surface 43 of the body 41. Upper end surfaces of the upper surface 43 and the circular wall 44 are parallel to the horizontal plane.

The circular wall 44 has connecting plates 71 and 72, and curved plates 73 and 74. The outer shape of each of the connecting plates 71 and 72 is substantially rectangular when viewed from the left-right direction x1. Each of the connecting plates 71 and 72 has a plate-like shape expanding in the up-down direction z1 and the front-rear direction y1. The connecting plate 71 is positioned to be apart from the needle 45 on the right side, and the connecting plate 72 is positioned to be apart from the needle 45 on the left side. Each of the curved surfaces 73 and 74 has a circular arc shape in a plan view from the upper side (hereinafter referred to as a "first plan view"). The curved plate 73 swells or protrudes frontward, and the curved plate 74 swells or protrudes rearward. The curved plate 73 is positioned to be apart from the needle 45 on the front side, and the curved plate 74 is positioned to be apart from the needle 45 on the rear side. The connecting plate 71 connects or links right ends, respectively, of the curved plates 73 and 74 to each other, and the connecting plate 72 connects or links left ends, respectively, of the curved plates 73 and 74 to each other.

In FIG. 4A, a rib 711, a groove 712 and a slit 713 are arranged side by side in this order from the front side to the rear side in the connecting plate 71.

The rib 711 perpendicularly projects to the left side, in the inner surface of the connecting plate 71 at a location in front of the needle 45. The rib 711 is continuous between both ends in the up-down direction z1 of the connecting plate 71, and extends linearly in the up-down direction z1. The rib 711 has a rectangular plate-like shape which is thin in the front-rear direction y1 and elongated in the up-down direction z1 in the first front view.

The groove 712 is positioned on the right side with respect to the needle 45, and is continuous between the both ends in the up-down direction z1 of the connecting plate 71, and extends linearly in the up-down direction z1. The groove 712 is recessed rightward from the inner surface of the connecting plate 71. The depth and/or the width of the groove 712 is/are substantially constant in an entire area, of the groove 712, between the both ends in the up-down direction z1 of the groove 712.

The slit 713 is continuous from a position, in the connecting plate 71, which is above to some extent from a lower end of the connecting plate 71 and the upper end of the connecting plate 71, and extends linearly in the up-down direction z1. A distance between the both ends in the up-down direction z1 of the slit 713 is substantially same as a distance between both ends in an extending direction z2 of a rib 813 (see FIGS. 6A and 6B). In the following, the distance between both ends in the up-down direction z1, and the distance between both ends in the extending direction z2 are each referred also simply as a "height". The width of the slit 713 is substantially constant over an entire area between the both ends in the up-down direction z1 of the slit 713.

In FIGS. 4A and 4B, the connecting plate 72 is constructed of an inner plate 75 and an outer plate 76 which expand in the up-down direction z1 and the front-rear direction y1. The inner plate 75 faces the outer plate 76 in the left-right direction x1, at a position which is closer to the needle 45 to some extent than the outer plate 76. A slit 721 and a rib 722 are formed in the inner plate 75.

The slit 721 is positioned on the left side with respect to the needle 45, is continuous between a position which is to some extent above a lower end of the inner plate 75 and an upper end of the inner plate 75, and linearly extends in the up-down direction z1. The slit 721 has a substantially same height as a rib 815 (see FIGS. 6A and 6B). The width of the slit 721 is substantially constant in an entire area between both ends in the up-down direction z1 of the slit 721.

The rib 722 perpendicularly projects to the right side, in the inner surface of the inner plate 75 at a location behind the needle 45. The rib 722 is continuous between the upper end and the lower end of the inner plate 75, and extends linearly in the up-down direction z1. The rib 722 has a plate-like shape which is similar to that of the rib 711 of the connecting plate 71. A projecting end surface (namely, a right side surface) of the rib 722 expands in the up-down direction z1 and the front-rear direction y1, and is inclined to some extent with respect to the left-right direction x1.

In FIG. 4A, a projecting part 731 is formed in the curved plate 73. The projecting part 731 is positioned apart from the needle 45 at a location which is substantially in front of the needle 45, and is positioned in the vicinity of the center in the left-right direction x1 of the curved plate 73. The projecting part 731 has a substantially rectangular shape in the first plan view, and projects rearward from the inner surface of the curved plate 73. A rear end surface of the projecting part 731 is a circular arc shape in the first plan view (see FIG. 4B). A right side surface and a left side surface of the projecting part 731 are each a flat surface which is substantially orthogonal to the left-right direction x1. The projecting part 731 is continuous between the both ends in the up-down direction z1 of the curved plate 73, except for a part 732 which is on a rear right corner in the first plan view of the projecting part 731, and extends linearly in the up-down direction z1. The part 732 is a substantially parallelogram in the first plan view, is continuous between a lower end of the curved plate 731 and a location which is below the upper end of the curved plate 73, and extends in the up-down direction z1.

The circular wall 44 partitions or defines a key hole 78 which is released upward, together with the ribs 711 and 722, the groove 712, the slits 713 and 721, the projecting part 731 and the part 732. The key hole 78 is an example of a "receiver key member" and/or an example of a "recessed part". A bottle 200A, which is to be descried later on, is connected to the key hole 78 in a case of ink replenishment. Although the key hole 78 conforms (fits) to a key member 855 formed on the side of the bottle 200A, the key part 78 does not conform to a key member of each of other bottles 200B to 200D.

The needle 45 extends from the upper surface 43 along the up-down direction z1 at a position which is substantially at the center in the front-rear direction y1 in the curved plates 73 and 74, and which is substantially at the center in the left-right direction x1 in the connecting plates 71 and 72. An upper end of the needle 45 is located at a position which is lower to some extent than the upper end of the circular wall 44 (see also FIG. 11B). A lower end of the needle 45 is positioned above the bottom of the containment chamber 46. The needle 45 is a member having a shape of circular pipe which is elongated in the up-down direction z1, and is an example of a "supply port" and/or a "communicating tube" of the tank. For a gas-liquid exchange with respect to the bottle 200A (to be described later on), the needle 45 is formed with two channels 451 and 452 (see FIG. 4B) which linearly extend in the up-down direction z1 from a forward end (upper end) of the needle 45 toward the containment chamber 46 of the body 41. In FIG. 4B, the channels 451 and 452 are partitioned by a partition wall 453 expanding in the up-down direction z1 in the entire area between the both ends in the up-down direction z1 of the needle 45. An upper end of the partition wall 453 is positioned above the upper ends of the channels 451 and 452. A lower end of the channel 451 is located below a lower end of the channel 452.

[Tanks 4B to 4D]

Each of the tanks 4B to 4D is another example of the "tank", and is provided with a body which is configured similarly to the body 41, except for the following points. In the body of each of the tanks 4B to 4D, a cylindrical wall partitions a key hole which is released upward, by a combination of at least one kinds of a rib, a groove, a slit and a projecting part, or a combination of not less than two kinds of the rib, the groove, the slit and the projecting part. Here, the combination of the rib, the groove and the slit are mutually different among the tanks 4A to 4D. The three-dimensional shapes of the respective key holes of the tanks 4B to 4D are mutually different, and are also different from the three-dimensional shape of the key hole 78. In the present embodiment, the three-dimensional shape of each of the key holes is determined by the sizes and positions in the left-right direction x1, the front-rear direction y1 and the up-down direction z1 of the rib, the groove, the slit or the projecting part. Other than this, the bodies of the tanks 4B, 4C and 4D are different from the body 41 in view of a point of containing the inks of C color, M color and Y color. The bodies of the tanks 4B to 4D may be different from the body 41 in view of the volume of the ink.

In FIG. 3A, the holding member 51A covers the upper surface 43 (see FIG. 4A) of the body 41. The holding member 51A is formed with a through hole 511 (see FIG. 5A) through which the circular wall 44 and the needle 45 (see FIG. 4A) are inserted. The holding member 51B collectively covers the upper surfaces of the tanks 4B to 4D (see FIG. 3B). The holding member 51B is formed with through holes 511B to 511D (see FIG. 5A). Cylindrical walls and needles possessed by the tanks 4B to 4D are inserted through the through holes 511B and 511D, respectively.

A bearing 53A is provided on the holder member 51A, at a location behind the through hole 511A. Bearings 53B to 53D are provided on the holder member 51B, each at a location behind one of the through holes 511B to 511D. Each of the bearings 53A to 53D has the rotation axis which is parallel to the left-right direction x1, and supports one of the caps 6A to 6D between a closing position P21 (see FIG. 3A) and an opening position P22 (see FIG. 5A), rotatably about the rotation axis of one of the bearings 53A to 53D.

In FIGS. 3A and 3B and FIGS. 5A and 5B, the cap 6A has a rubber part 61A and an arm part 62A. The rubber part 61A has a cylindrical shape of which diameter is greater than that of the needle 45 (see FIGS. 4A and 4B), and has a hole through which the needle 45 is inserted. Note that FIG. 5A does not illustrate the needle 45, for the sake of convenience. The arm part 62A is formed of a resin material which is harder than that forming the rubber part 61A, and has an elongated stick or bar-like shape. The rubber part 61A is attached to one end of the arm part 62A. The other end of the arm part 62A is provided with a rotation shaft through which the bearing 53A is inserted.

As depicted in FIG. 3A, in a case that the cap 6A is at the closing position P21, the arm part 62A extends frontward from the bearing 53A, and the rubber part 61A fits (is inserted) into the key hole 78 via the through hole 511A of the holding member 51A. In this situation, the needle 45 is inserted into the hole of the rubber part 61A. Note that for the sake of convenience, FIG. 5A does not illustrate the needle 45 and the key hole 78. With this, any leaking and/or drying of the ink inside the body 41 is/are prevented. The opening position P22 is a position which is rotated, from the closing position P21, at an angle approximately in a range of 90 degrees to 100 degrees about the rotation axis of the bearing 53A.

Although the caps 6B to 6D have a similar configuration to that of the cap 6A, the caps 6B to 6D are different from the cap 6A in view of that each of the caps 6B to 6D is inserted into the key hole provided on one of the tanks 4B to 4D (see FIG. 3B, etc.) via one of through holes 511B to 511D of the holding member 51B.

In a case that the casing cover 2 is at the exposing position P12 (see FIG. 1B), each of the tank covers 52A and 52B is rotatable (pivotable), about the rotation axis on the rear side of one of the bearings 53A to 53D, between a covering position P31 and an exposing position P32 (see FIG. 3A). In a case that the tank cover 52A is at the covering position P31, the tank cover 52A covers the holding member 51A, the cap 6A and the bearing 53A from thereabove. In a case that the tank cover 52B is at the covering position P31, the tank cover 52B covers the holding member 51B, the caps 6B to 6D and the bearings 53B to 53D from thereabove. The exposing position P32 is a position which is rotated, from the covering position P31, at an angle approximately in a range of 90 degrees to 100 degrees about the rotation axis of each of the tank cover 52A and the tank cover 52B.

[Bottles 200A to 200D]

Figure 5A:
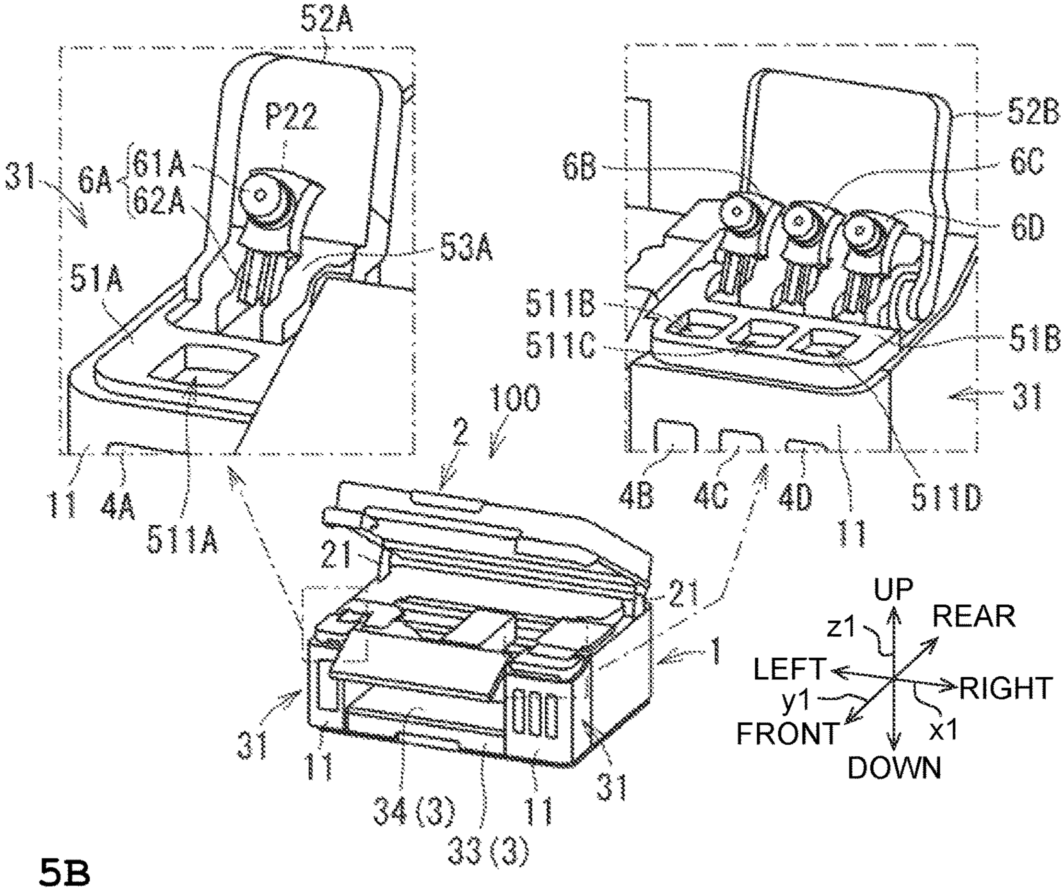
FIG. 5A is a perspective view of the tank set in a case that the caps are each at an opening position.
Figure 5B:
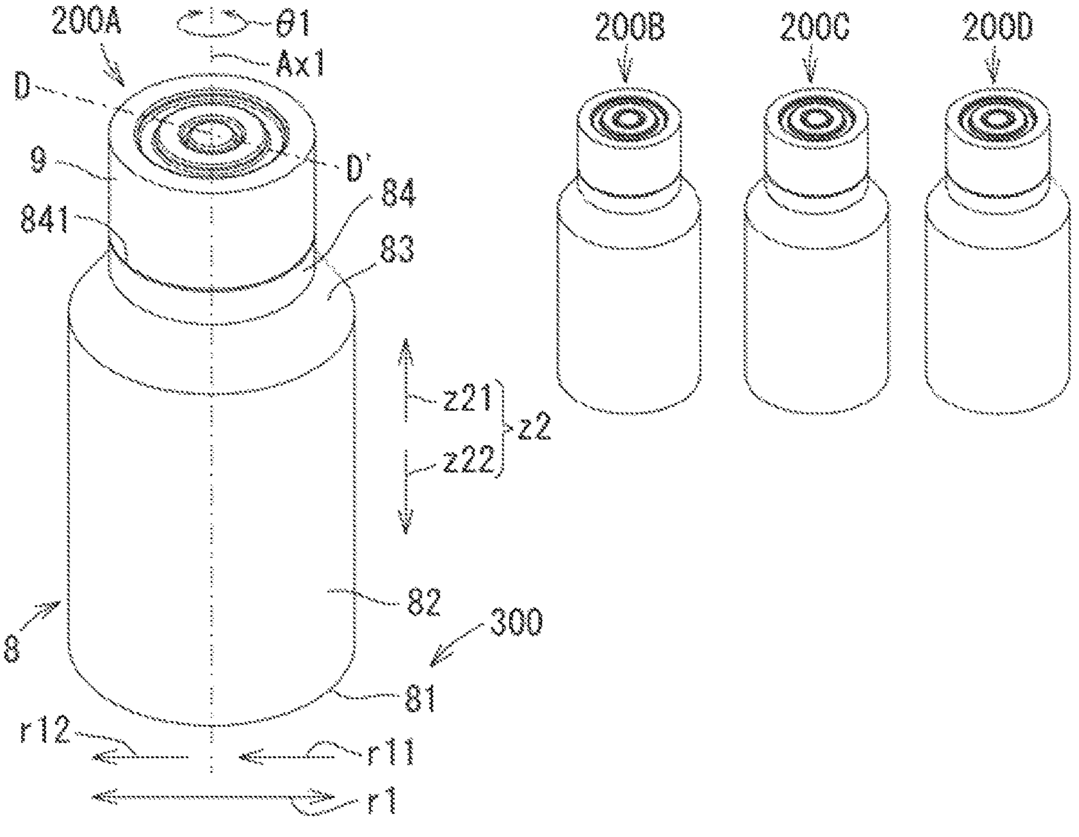
FIG. 5B is a perspective view of each of bottles.

As depicted in FIG. 5B, in the MFP 100 (see FIGS. 1A and 1B), for example, four bottles 200A to 200D are used for replenishing the tanks 4A to 4D with the inks, respectively. The bottles 200A to 200D are a remaining part of the liquid supply apparatus. Note that in FIG. 5B, the bottle 200A is illustrated to be greater than the bottles 200B to 200D, for the sake of convenience. The bottle 200A stores a replenishing ink for the tank 4A (the ink of K color). The bottle 200A is provided with a bottle body 8 and a bottle cap 9. The bottle 200A is an example of a "liquid containment bottle", and the bottle cap 9 is an example of a "cap".

[Bottle Body 8]

Figure 6A:
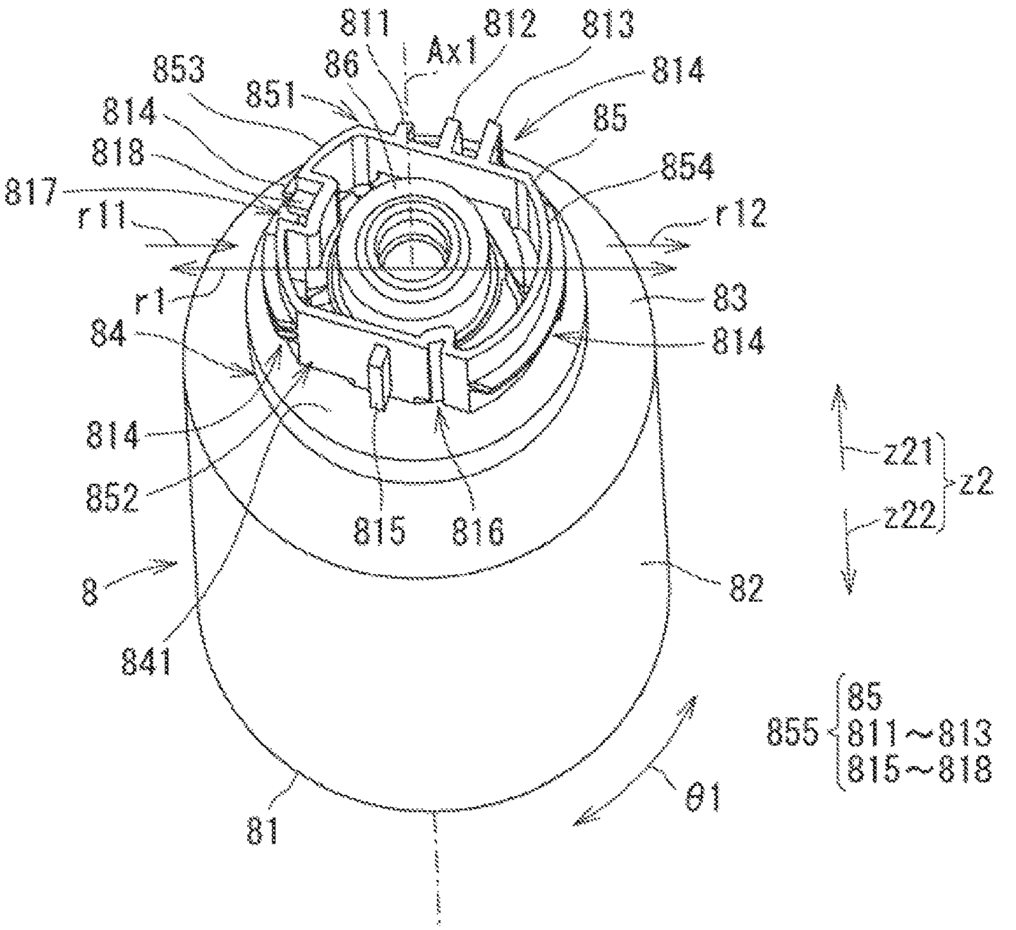
FIG. 6A is a perspective view depicting the outer appearance of a bottle body.

In FIG. 6A, the bottle body 8 has a bottom part 81, a trunk part 82, a shoulder part 83, a base part 84, a circular wall 85 and a neck part 86.

[Bottom Part 81]

Figure 6B:
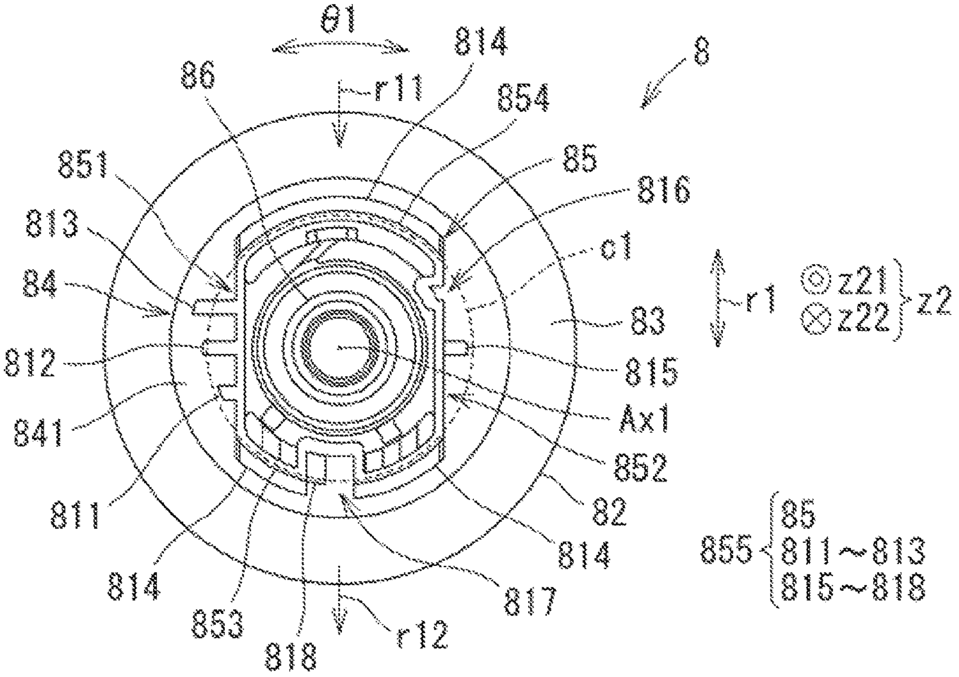
FIG. 6B is a plan view of the bottle body as seen in an approaching orientation.

The bottom part 81 is a flat part of a bottom wall which has a substantially disc-shape. A posture assumed by the bottle body 8 in a case that the bottom part 81 is brought into contact with a horizontal plane 300 (see FIG. 5B) to thereby place the bottle body 8 on the horizontal plane 300 is referred to as a "placement posture". A virtual line passing through the center of the bottom part 81 and orthogonal to the bottom part 81 is referred to as an "axis Ax1". In the extending direction z2 in which the axis Ax1 extends, an orientation from the bottom part 81 toward the neck part 86 is also referred to as a separating orientation z21, and an orientation reverses to the separating orientation is also referred to as an approaching orientation z22. In a radial direction r1 of the axis Ax1, an orientation approaching toward the axis Ax1 is also referred to as a centripetal orientation r11, and an orientation reverse to the centripetal orientation r11 is also referred to as a centrifugal orientation r12. FIGS. 6A and 6B depict only an example of each of the radial direction r1, the centripetal orientation r11 and the centrifugal orientation r12.

[Trunk Part 82, Shoulder Part 83]

The trunk part 82 is a wall which has a substantially cylindrical shape extending from an outer edge of the bottom part 81 in the separating orientation z21. The shoulder part 83 is a wall which extends from an extending end of the trunk part 82 in the centripetal orientation r11. The shoulder part 83 is inclined with respect to the radial direction r1 of the axis Ax1 so as to further apart from the bottom part 81 as approaching closer to the axis Ax1. An extending end of the shoulder part 83 is away (apart) from the axis Ax1 in the centrifugal orientation r12, and has a circular shape in a plan view from the approaching orientation z22 (hereinafter also referred to as a "second plan view").

[Base Part 84]

The base part 84 has a side wall and an upper wall. The side wall projects from the projecting end of the shoulder part 83 in the separating orientation z21 (namely, upward) in a case that the bottle body 8 assumes the placement posture and has a substantially cylindrical shape. The upper wall projects from the projecting end (namely, the upper end) of the side wall of the base part 84 in the centripetal orientation r11 and has a substantially ringed shape in the second plan view. The base part 84 has an upper surface 841 (an example of a "base end surface"). The upper surface 841 defines an upper end in an outer surface of the base part 84, and is a surface parallel to the radial direction r1.

[Containment Chamber 87]

Figure 7A:
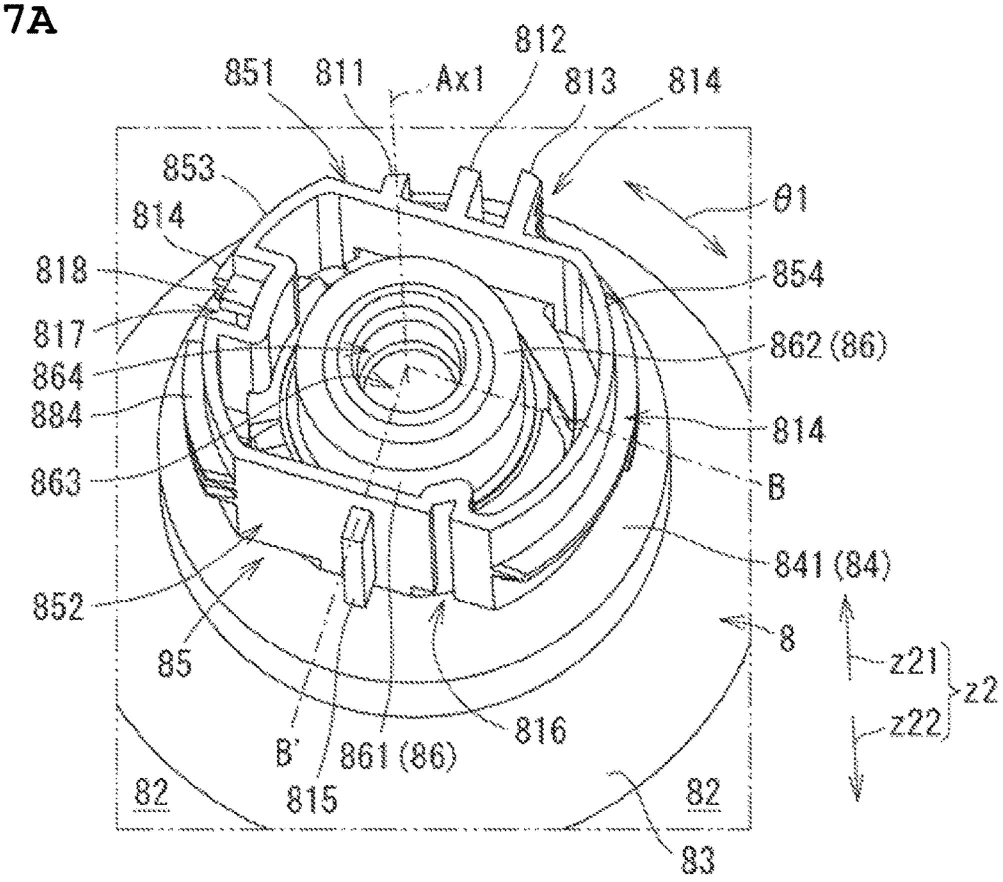
FIG. 7A is a perspective view depicting the outer appearance of a circular wall and a neck part.
Figure 7B:
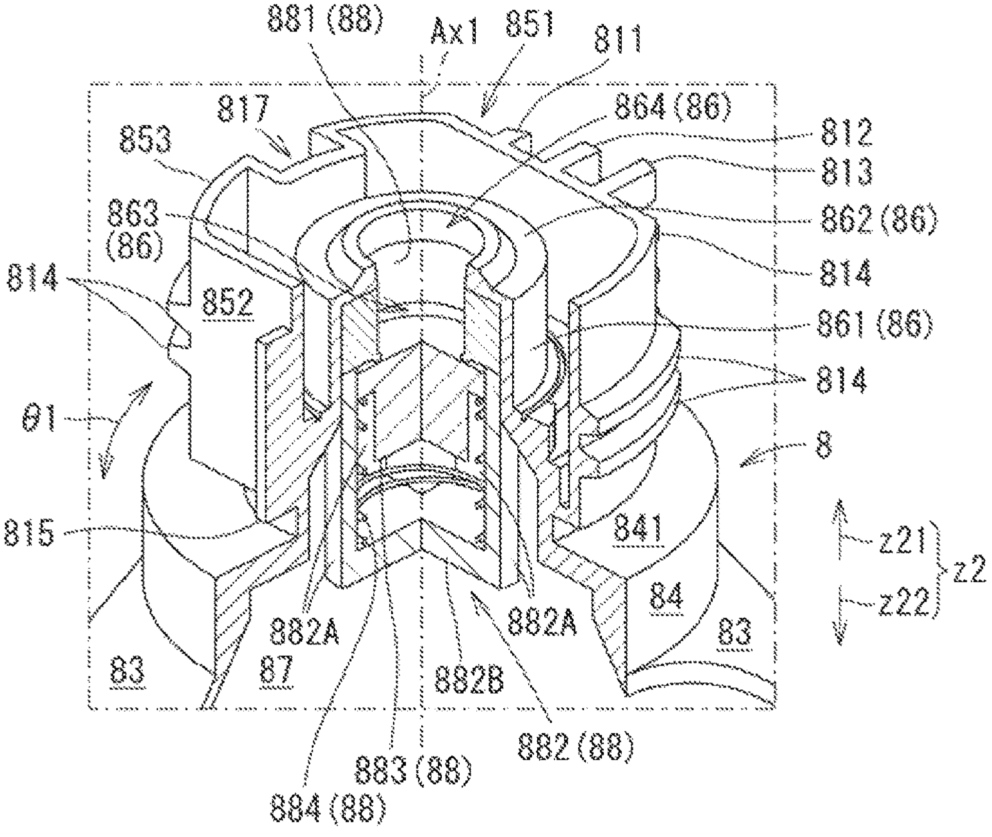
FIG. 7B is a vertical cross sectional view of the bottle body along a one-dot chain line B-B' in FIG. 7A and is a view depicting the configuration of a valve mechanism.

In FIG. 7B, a space defined by the bottom part 81 (see FIG. 6A), the trunk part 82 (see FIG. 7A), the shoulder part 83 and the base part 84 constructs a containment chamber 87 configured to store the ink of K color therein.

[Circular Wall 85, Neck Part 86]

In FIG. 6A, the circular wall 85 and the neck part 86 extend in the separating orientation z21 with respect to the upper surface 841 of the base part 84. An extending end of the circular wall 85 is parallel to the upper surface 841. The height of the circular wall 85 is not more than the height of the circular wall 44 in the tank 4A (see also FIGS. 11A and 11B).

[Circular Wall 85]

In FIGS. 6A and 6B, the circular wall 85 has connecting plates 851 and 852 and curved plates 853 and 854. An end in the separating orientation z21 in the circular wall 85 is the periphery of an opening.

Each of the connecting plates 851 and 852 is a flat plate having a substantially linear shape in the second plan view, and the connecting plates 851 and 852 face each other in the radial direction r1 with the neck part 86 being interposed therebetween. At the time of ink replenishment, the connecting plate 851 is positioned on the left side with respect to the connecting plate 71 of the circular wall 44 (see FIG. 4A), and the connecting plate 852 is positioned on the right side with respect to the connecting plate 72 of the circular wall 44 (see FIGS. 4A and 4B).

Each of the curved plates 853 and 854 has a circular arc shape located on a virtual circle c1 (see FIG. 6B) in the second plan view, and the curved plates 853 and 854 face each other in the radial direction r1 with the neck part 86 being interposed therebetween. The virtual circle c1 is a circle having the axis Ax1 as the center thereof in the second plan view, and has a diameter which is smaller to some extent than that of the upper surface 841. Specifically, the planar shape of the upper surface 841 of the base part 84 is substantially circular. The curved plate 853 extends, in the upper surface 841, in the separating orientation z21 from a position along the virtual circle c1. The curved plate 854 extends, on the upper surface 841, in the extending orientation z2 (or "the separating orientation z21) from a position which is rotationally moved approximately by 180 degrees from the position occupied by the curved plate 853 in a circumferential direction θ1 of the axis Ax1. The curved plate 853 is connected or linked to one ends, respectively, of the connecting plates 851 and 852, which are located to approach toward each other in the circumferential direction θ1. The other ends, respectively, of the connecting plates 851 and 852 are connected to each other by the curved plate 854. The curved plate 853 has such a shape that, at the time of ink replenishment, the curved plate 853 is overlapped with the curved plate 73 of the circular wall 44 (see FIG. 4A) at a position behind the curved plate 73; the curved plate 854 has such a shape that, at the time of ink replenishment, the curved plate 854 is overlapped with the curved plate 74 of the circular wall 44 (see FIGS. 4A and 4B) at a position in front of curved plate 74.

In FIGS. 6A and 6B, ribs 811 to 813 project perpendicularly from the outer surface of the connecting plate 851 toward the outside of the circular wall 85. Among the ribs 811 to 813, the rib 811 is positioned closest to the curved plate 853 and the rib 813 is positioned closest to the curved plate 854. Each of the ribs 811 to 813 is continuous at both ends in the extending direction z2 of the connecting plate 851, and extends linearly in the extending direction z2. Each of the ribs 811 to 813 has a substantially same height as the slit 713 (see FIG. 4A) in the tank 4A. The ribs 811 to 813 do not protrude, in the second plan view, from the upper surface 841 of the base part 84. Specifically, the maximum distance between the both ends in the projecting direction of the rib 811 is shorter than the distance between the both ends in the projecting of the rib 711 (see FIG. 4A) on the side of the tank 4A. In order to avoid any interference with respect to the bottle cap 9, a distance from the axis Ax1 to the projecting end of the rib 811 in the radial direction r1 (an example of a "first distance") is shorter than a distance from the axis Ax1 to the outer circumferential surface of the curved plate 853 in the radial direction r1 (an example of a "second distance"). At a time of completing the connection between the bottle 200A and the tank 4A, the rib 811 makes contact with the rib 711 from the rear side. In this situation, the projecting end (namely, the left end) of the rib 711 makes contact with the connecting plate 851 from the right side. The rib 812 fits (is inserted) into the groove 712 at a time of connecting the bottom 200A with the tank 4A; in this situation, the projecting end of the rib 812 makes contact with the bottom of the groove 712 from the left side. The rib 813 is inserted into the slit 713 at the time of connecting the bottom 200A with the tank 4A. A part of the projecting end surface of the rib 813 is notched and forms a part of a male screw 814 (see FIG. 6A) which will be described later on.

In FIGS. 6A and 6B, a rib 815 and a groove 816 are formed on the outer surface of the connecting plate 852. The rib 815 projects perpendicularly and toward outside of the circular wall 85 in the outer surface of the connecting plate 852, at a location closer to the curved plate 853 than the groove 816. A projecting end of the rib 815 does not protrude, in the second plan view, from the upper surface 841 in the centrifugal orientation r12. The rib 815 has a height which is substantially same as the height of the slit 721 (see FIGS. 4A and 4B). Specifically, ends in the approaching orientation z22, respectively, of the rib 815 and the connecting plate 852 are located at mutually same positions. On the other hand, an end in the separating orientation z21 of the rib 815 is at a location which is closer, to some extent, to the approaching orientation z22 than an end in the separating orientation z21 of the connecting plate 852, as depicted in FIG. 6A. Namely, a distance in the extending direction z2 from the upper surface 841 to the end in the separating orientation z21 of the rib 815 (an example of a "third distance") is shorter than a distance in the extending direction z2 from the upper surface 841 to the end in the separating orientation z21 of the connecting plate 852 (an example of a "fourth distance"). Note that the separating orientation z21 is the up-down direction z1 in the placement posture, and the end in the separating orientation z21 is the upper end in the placement posture. At the time of completion of the connection between the bottle 200A and the tank 4A, the rib 815 is inserted into the slit 721, and the end in the separating orientation z21 of the rib 815 makes contact with a lower end of the slit 721. The groove 816 is continuous between the both ends in the extending direction z2 of the connecting plate 852, and extends linearly in the extending direction z2. The groove 816 is recessed from the outer surface to the inner surface of the connecting plate 852. The bottom surface of the groove 816 is parallel to the circumferential direction θ1 in the first plan view. The width of the groove 816 is substantially constant between both ends in the axial direction of the connecting plate 852. At the time of the ink replenishment, the rib 722 (see FIGS. 4A and 4B) fits (is inserted) into the groove 816; in this situation, the projecting end of the rib 722 makes contact with the bottom of the groove 816 from the left side.

In FIGS. 6A and 6B, another part of the male screw 814 is formed in the outer circumferential surface of each of the curbed plates 853 and 854, at a location in the vicinity of the center in the extending direction z2. As described above, the part of the male screw 814 is formed also in the rib 813. Namely, the male screw 814 is formed in a divided manner in the projecting end surface of the rib 813 and the curved plates 853 and 854. The male screw 814 is screwed (threadedly engaged) with respect to a female screw 93 formed in the bottle cap 9.

A groove 817 is formed in the outer surface of the curved plate 853. The groove 817 is continuous between both ends in the extending direction z2 of the curved plate 853, at a location in a center part in the circumferential direction θ1 of the curved plate 853, and extends linearly in the extending direction z2. The groove 817 is recessed from the outer circumferential surface toward the inner circumferential surface of the curved plate 853. A bottom surface of the groove 817 is parallel to the circumferential direction θ1 in the first plan view. The width and the depth of the groove 817 are substantially constant between the both ends in the extending direction z2 of the curved plate 853, except for a part corresponding to a rib 818 which will be described later on. Specifically, the depth of the groove 817 is substantially same as a size in the front-rear direction y1 of the projecting part 731, and the width of the groove 817 is same as the maximum value of the size in the left-right direction x1 in the projecting part 731. A rib 818 is formed in the groove 817. The rib 818 extends, in the groove 817, from one side surface in the circumferential direction θ1 (a side surface in a clockwise orientation in FIGS. 6A and 6B) of the groove 817. The rib 818 extends from a location, in the groove 817, between both ends in the radial direction r1 of the groove 817, and expands in the radiation direction r1 and the circumferential direction θ1. The rib 818 has a shape which is substantially same as that of the part 732 (see FIG. 4A) on the side of the tank 4A, in the second plan view, and the rib 818 has a plate-like shape which is thin in the extending direction z2. An end surface in the separating orientation z21 of the rib 818 is apart (separated), in the approaching orientation z22, from an end in the separating orientation z21 of the groove 817, by an amount corresponding to the height of the part 732 (see FIG. 4A).

The groove 817 conforms (fits) to the projecting part 731 (see FIGS. 4A and 4B) at the time of completion of the connection between the bottle 200A and the tank 4A; in this situation, the end surface in the separating orientation z21 of the rib 818 makes contact with the part 732 from thereabove.

The circular wall 85 forms a key member 855 which is configured to conform to (fit into) the key hole 78 (see FIGS. 4A and 4B), together with the ribs 811 to 813, 815 and 818 and the grooves 816 and 817.

[Neck Part 86]

In FIGS. 7A and 7B, the neck part 86 is an example of a nozzle and/or a nozzle upper part. The neck part 86 projects in the separating orientation z21 (an example of the "first direction"), with respect to the upper surface 841 of the based part 84. Specifically, the neck part 86 has a side wall 861 and a circular wall 862. The side wall 861 extends in the separating orientation z21, from a location which is apart from the upper surface 841 in the separating orientation z21, and apart from the circular wall 85 in the centripetal orientation r11. The side wall 861 has a substantially cylindrical shape which is coaxial with the axis Ax1. The circular wall 862 extends in the centripetal orientation r11 from the end in the separating orientation z21 of the side wall 861. In the second plan view, a through hole which is coaxial with the axis Ax1 and which is substantially circular shaped (round shaped) is formed in the center of the circular wall 862 in the second plan view. The side wall 861 and the circular wall 862 partition or demarcate a space which is substantially cylindrical in the inside of the neck part 86. This space forms a part of a channel 863 through which the ink contained in the containment chamber 87 passes. As appreciated from FIG. 7B, in a case that a valve body 883 does not make tight contact with a rubber part 881, an end in the approaching orientation z22 of the channel 863 is continuous with the containment chamber 87 via a space defined between side parts 882A in a supporting member 882. The channel 863 is continuous with an outflow port 864 (an example of an "opening") at an end in the separating orientation z21 of the channel 863. The outflow port 864 is a forward end surface in the separating orientation z21 of the neck part 86, in the through hole of the circular wall 862, and is an opening which is opened in the separating orientation z21. The outflow port 864 has a diameter which is slightly greater than the needle 45, and allows the ink which passed through the channel 863 to flow out to the outside of the bottle 200A.

[Relationship between Circular Wall 85 and Neck Part 86]

The circular wall 85 is positioned in the surrounding of the neck part 86, with a spacing distance from the neck part 86 in the centrifugal orientation r12 (an example of the "second direction"). In the separating orientation z21, a forward end of the circular wall 85 is apart from the bottom part 81 farther than the forward end of the neck part 86. In the placement posture, the forward end of the circular wall 85 is positioned above the forward end of the neck part 86.

[Valve Mechanism 88]

In FIG. 7B, the bottle body 8 is further provided with a valve mechanism 88 in the internal space of the neck part 86. The valve mechanism 88 has a rubber part 881, a supporting member 882, a valve body 883 and a coil spring 884.

The rubber part 881 has a bottomless cylindrical shape, and is inserted into the internal space of the neck part 86 so as to be coaxial with the axis Ax1. At the time of insertion, the outer circumferential surface of the rubber part 881 makes tight contact with the side wall 861, and one end surface of the rubber part 881 makes tight contact with the circular wall 862. The inner circumferential surface of the rubber part 881 has a diameter which is substantially same as that of the outflow port 864, except for the other end part of the rubber part 881. The other end in the inner circumferential surface of the rubber part 881 projects slightly in both of the centripetal orientation r11 and the approaching orientation r22. This makes the diameter of the other end of the inner circumferential surface of the rubber part 881 to be slightly smaller than the outflow port 864 and/or the needle 45. In the extending direction z2, the rubber part 881 is slightly shorter than the neck part 86.

The supporting member 882 is, for example, an integrated molded item formed of a resin, and is attached to the internal space of the neck part 86 so as to bring the rubber part 881 into tight contact with the circular wall 862. The supporting member 882 has four side parts 882A and a bottom part 882B. Each of the side parts 882A is fixed in the inner circumferential surface of the side wall 861, such that the rubber part 881 and the side parts 882A are arranged in this order in the approaching orientation z22. A forward end of each of the side parts 882A makes contact with the other end surface of the rubber part 881. The respective side parts 882A are arranged side by side with spacing distances at equal angles therebetween in the circumferential direction θ1; each of the side parts 882A extends from a forward end thereof toward the containment chamber 87, along the inner circumferential surface of the side wall 861. Owing to the space between the respective side parts 882A, the channel 863 and the containment chamber 87 are continued so as to allow the ink to flow therethrough. The bottom wall is cross-shaped in the second plan view, and extends from a position which is apart from the other end surface of the rubber part 881 in the approaching orientation z22 and which is in the vicinity of the axis Ax1, radially toward the ends in the approaching orientation z22, respectively, of the side parts 882A, and is linked or connected to the respective side parts 882A. The respective side parts 882A and the bottom part 882B of the supporting member 882 define or demarcates an accommodating space. The accommodating space is substantially cylindrical shaped, and accommodates the valve body 883 and the coil spring 884 therein.

The valve body 883 and the coil spring 884 are accommodated or stored in the accommodating space (namely, the channel 863) of the supporting member 882. The valve body 883 is accommodated to be movable in the extending direction z2 in the inside of the accommodating space. The respective side parts 882A of the supporting member 882 make contact with the valve body 883 to thereby guide the movement of the valve body 883. The valve body 883 has a circular shape in the second plan view, and has a diameter which is substantially same as the accommodating space having the cylindrical shape. The coil spring 884 is a torsion coil spring, and is positioned between the bottom part of the supporting member 882 and the valve body 883 in the accommodating space. The coil spring 884 makes contact with the valve body 883 in the inside of the accommodating space, and urges the valve body 883 in the separating orientation z21. With this, in a case that a contact force in the approaching orientation z22 is not applied from the needle 45 to the valve body 883, the valve body 883 makes tight contact with the other end surface of the rubber part 881, which in turn prevents the ink in the containment chamber 87 from leaking from the outflow port 864.

[Seat Surface 865A, Circular Groove 865E, Inclined Grooves 865F to 865H]

Figure 8:
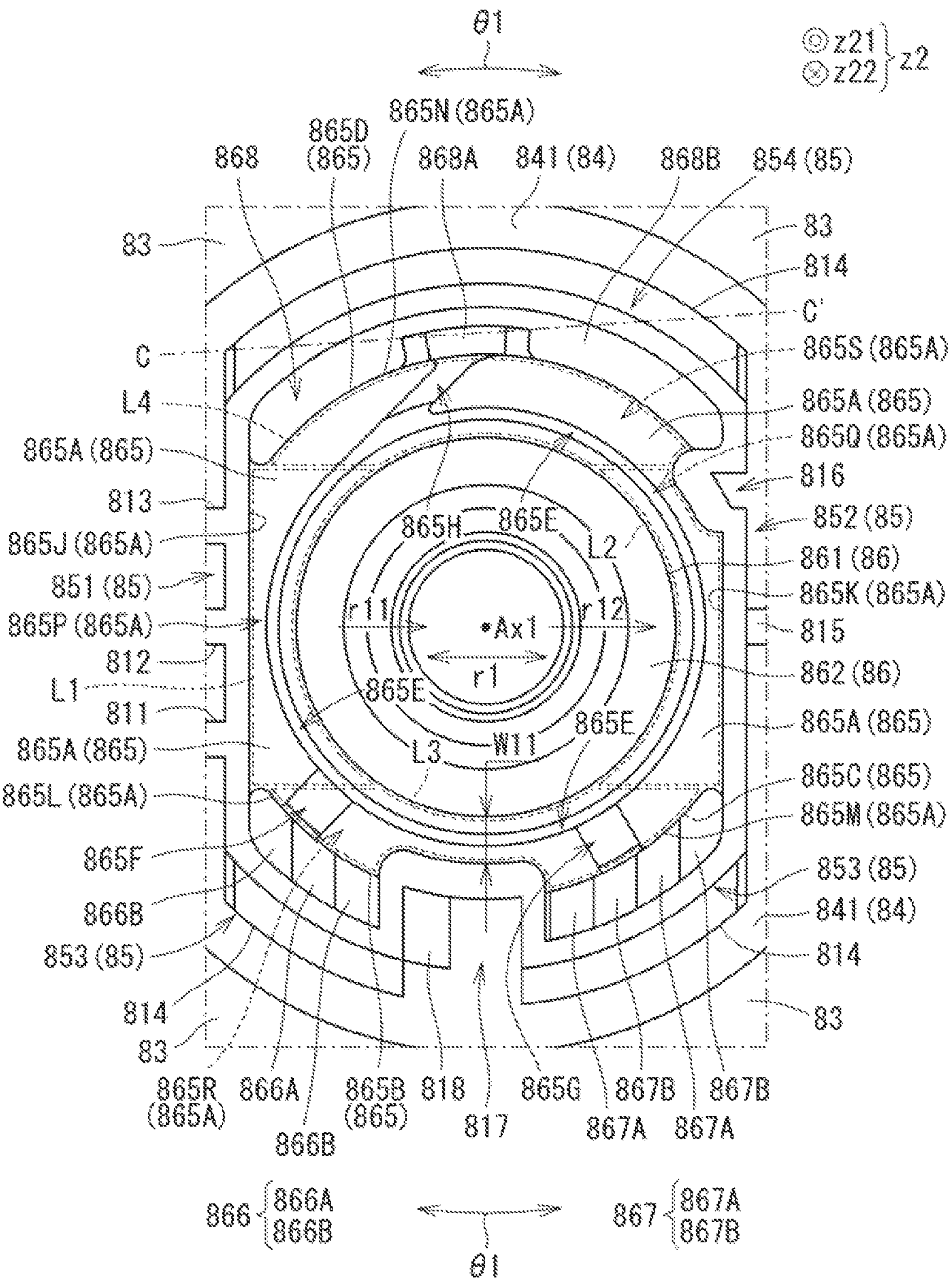
FIG. 8 is a plan view of a seat part and trench parts in the neck part, as seen in the approaching orientation.
Figure 9:
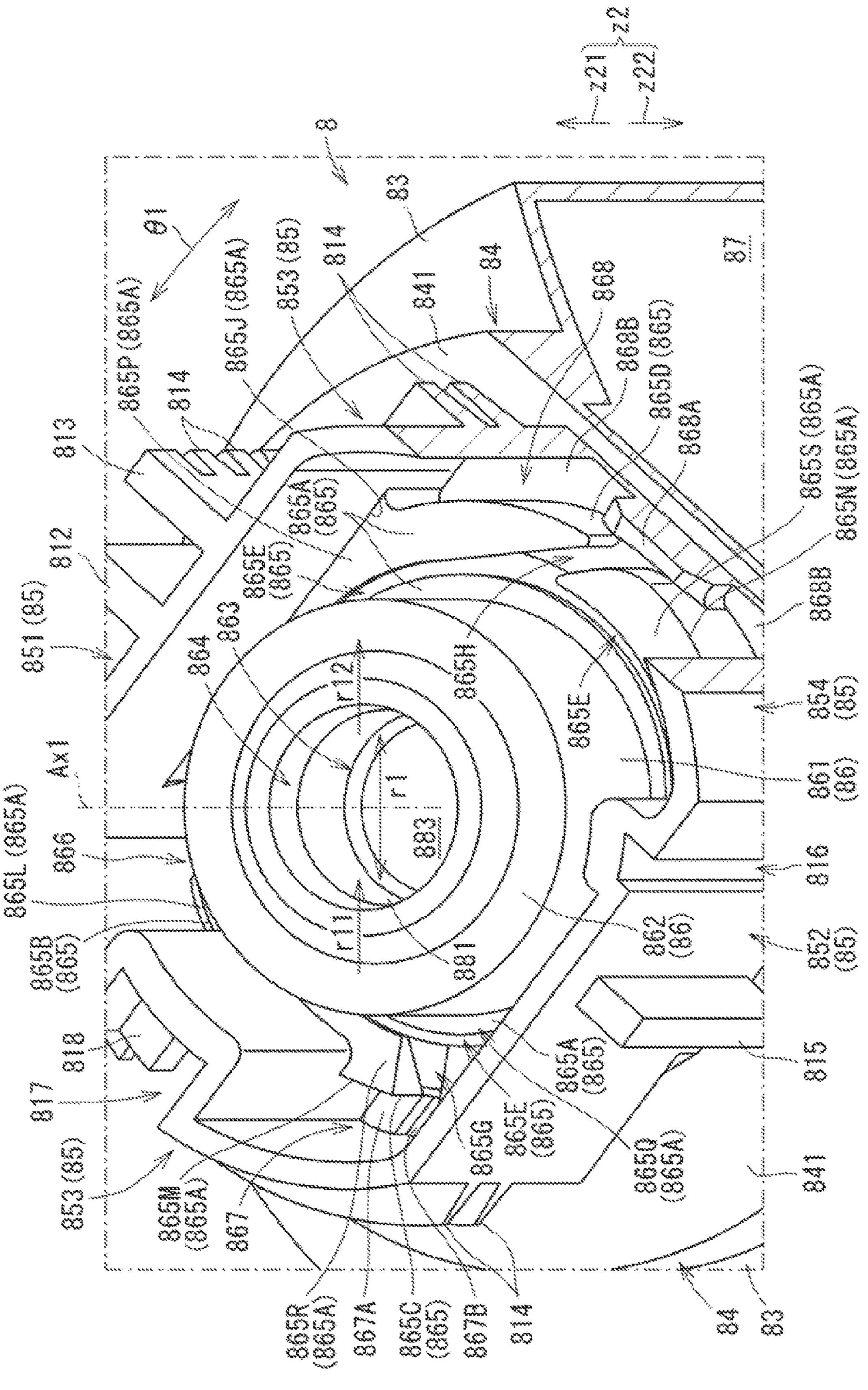
FIG. 9 is a vertical cross-sectional view of the bottle body along a one-dot chain line C-C' of FIG. 8.

In FIGS. 8 and 9, the neck part 86 is provided with a seat part 865 and trench parts 866 to 868. The seat part 865 is provided with a seat surface 865A and three outer circumferential surfaces 865B to 865D.

The seat surface 865A has a substantially ring shape surrounding the entire circumference of the neck part 86 in the second plan view, at the outside of the neck part 86. The seat surface 865A is a surface parallel to the radial direction r1. Specifically, the seat surface 865A extends in the centrifugal orientation r12 toward the circular wall 85 from the entire circumference of the outer circumferential surface, in the neck part 86, which is apart from the forward end surface in the approaching orientation z22. Namely, the seat surface 865A is at a position which is closer to the circular wall 85 in the radial direction r1 than the forward end surface of the neck part 86 and which is closer to the containment chamber 87 in the extending direction z2 than the forward end surface of the neck part 86. Further, in the placement posture of the bottle body 8, the seat surface 865A is oriented upward at a location below the forward end surface of the neck part 86. Although the seat surface 865A is continuous with the inner surfaces, respectively, of the connecting plates 851 and 852 and the bottom wall of the groove 817, the seat surface 865A is not continuous with the inner surfaces, respectively, of the curved plates 853 and 854. The width in the radial direction r1 of the seat surface 865A becomes to a minimum width W11 between the neck part 86 and the groove 817.

The seat surface 865A has crossing parts 865J and 865K, and non-crossing parts 865L, 865M and 865N. The crossing parts 865J is a part which crosses a lower end of the connecting plate 851 in the placement posture, at an outer edge of the seat surface 865A. The outer edge of the seat surface 865A is a circumferential edge in the centrifugal orientation r12 of the seat surface 865A. Further, the lower end of the connecting plate 851 is an end in the approaching orientation z22. The crossing part 865K a part which crosses the lower end of the connecting plate 852 in the placement posture, at the outer edge of the seat surface 865A. Each of the non-crossing parts 865L, 865M and 865N is a part which crosses an upper end of one of the outer circumferential surfaces 865B, 865C and 865D, at the outer edge of the seat surface 865A.

The seat surface 865A further has first areas 865P and 865Q. The first area 865P is an area, in the seat surface 865A, between the crossing part 865J and the side wall 861 of the neck part 86, and substantially is an area surrounded by a broken line L1 in FIG. 8. The first area 865Q is an area, in the seat surface 865A, between the crossing part 865K and the side wall 861, and substantially is an area surrounded by a broken line L2 in FIG. 8.

The seat surface 865A further has second areas 865R and 865S, in addition to the first areas 865P and 865Q. The second area 865R is an area between the non-crossing parts 865L and 865M and the side wall 861, and substantially is an area surrounded by a broken line L3 in FIG. 8. The second area 865S is an area between the non-crossing part 865N and the side wall 861, and substantially is an area surrounded by a broken line L4 in FIG. 8.

The outer circumferential surface 865B extends, at the outer edge of the seat surface 865A, in the approaching orientation z22 from a part between the groove 817 and the connecting plate 851. The outer circumferential surface 865C extends, at the outer edge of the seat surface 865A, in the approaching orientation z22 from a part between the groove 817 and the connecting plate 852. The outer circumferential surfaces 865B and 865C are continuous, respectively, with the bottom surfaces of the trench parts 866 and 867. The outer circumferential surface 865D extends, at the outer edge of the seat surface 865A, in the approaching orientation z22 from a part which faces the curved plate 854 in the centripetal orientation r11, and is continuous with the bottom surface of the trench part 868.

Each of the trench parts 866 to 868 defines a space which is configured to store or collect the ink between the circular wall 85 and the seat part 865 of the neck part 86. The trench part 866 is defined or demarcated by the seat part 865, the groove 817, the connecting plate 851 and the curved plate 853. The trench part 867 is defined by the seat part 865, the groove 817, the connecting plate 852 and the curved plate 853. The trench part 868 is defined by the seat part 865, the connecting plates 851 and 852 and the curved plate 854. Each of the trench parts 866 to 868 is recessed from the seat surface 865A in the approaching orientation z22. An end in the separating orientation z21 of each of the trench parts 866 and 868 is made to be an opening which is released in the separating orientation z21.

The depth of each of the trench parts 866 and 867 is not constant in the circumferential direction θ1, and varies depending on a position in the circumferential direction θ1. Specifically, the bottom part of the trench part 866 has a part 866A which is relatively shallow and which is located at an intermediate position in the circumferential direction θ1, and has parts 866B which are relatively deep and which are located in the vicinity, respectively, of the both ends in the circumferential direction θ1. The part 866A and the parts 866B are, respectively, an example of a "first bottom part" and an example of a "second bottom part", and are located to be apart with respect to the seat surface 865A in the approaching orientation z22. The parts 866B are apart from the seat surface 865A in the approaching orientation z22 further than the part 866A. Namely, in the placement posture, the parts 866B are located at a position below the part 866A. The trench part 867 has such a depth that shallow parts 867A and deep parts 867B are alternately appear in the circumferential direction θ1. In the placement posture, each of the parts 867B is located at a position below one of the parts 867A. The parts 867A and the parts 867B are, respectively, another example of the "first bottom part" and an example of the "second bottom part".

The part 866A is connected to each of the outer circumferential surface 865B and the curved plate 853, and is continuous between the outer circumferential surface 865B and the curved plate 853. Accordingly, the part 866A functions as a rib partitioning a space defined by the trench part 866 into a plurality of small spaces. Similarly, each of the parts 867A functions as a rib partitioning a space defined by the trench part 867 into a plurality of small spaces.

A circular groove 865E and inclined grooves 865F to 865H (examples of a "groove") are formed in the seat surface 865A. The circular groove 865E is has a ring shape surrounding the entire circumference of the neck part 86, and has a depth and a width which are substantially constant in the entire area in the circumferential direction θ1. The circular groove 865E is formed at a position which is apart from the outer circumferential surface of the neck part 86 in the centrifugal orientation r12 and which is apart from the outer circumferential surface of the seat surface 865A in the centripetal orientation r11. The inclined grooves 865F to 865H are connected, respectively, to the trench parts 866 to 868 from the circular groove 865E of the seat surface 865E. Specifically, the inclined groove 865F is formed in the second area 865R; the inclined groove 865F extends from the bottom surface of the circular groove 865E and reaches the trench part 866, extending linearly along the radial direction r1 therebetween. Specifically, an end in the centrifugal orientation r12 (namely, an outer edge) in the inclined groove 865F is located at a position, in the trench part 866, which is apart from the part 866B in the separating orientation z21 (namely, immediately above the part 866B in the placement posture). Further, the outer edge of the inclined groove 865F is located at a substantially intermediate position in the circumferential direction θ1 of the outer circumferential surface 865B in the second plan view. The inclined groove 865F is apart from the connecting plate 851 and the groove3 817 in the circumferential direction θ1. The inclined groove 865G is formed in the second area 865R; the inclined groove 865G extends from the circular groove 865E and reaches the trench part 867, extending linearly along the radial direction r1 therebetween. The inclined groove 865G is apart from both of the connecting plate 852 and the groove 817 in the circumferential direction θ1. The inclined groove 865H is formed in the second area 865S; the inclined groove 865H extends from the circular groove 865E and reaches the trench part 868, extending therebetween linearly and obliquely with respect to the radial direction r1. Specifically, an outer edge of the inclined groove 865G is located at a position in the trench part 867 which is apart from the part 867B in the separating orientation z21 (namely, immediately above the part 867B in the placement posture). Further, the outer edge of the inclined groove 865G is located at a substantially intermediate position in the circumferential direction θ1 of the outer circumferential surface 865C in the second plan view. The bottom surface of each of the inclined grooves 865F to 865H is inclined downward in the placement posture of the bottle body 8. Specifically, the bottom surface of each of the inclined grooves 865F to 865H is further apart from the seat surface 865A as separating from the circular groove 865E further in the centrifugal orientation r12. The outer edge of the inclined groove 865H does not reach a deepest part in the trench part 868, but reaches the shallow part 868A shallower than the part 868B which is the deepest in the trench part 868. The inclined groove 865H is apart from both of the connecting plates 851 and 852 in the circumferential direction θ1. The bottom surface of each of the inclined grooves 865F to 865H is inclined with respect to the radial direction r1 such that the bottom surface is further apart from the seat surface 865A as separating further from the circular groove 865E.

[Bottles 200B to 200D]

The bottles 200B to 200D are similar to the bottle 200A, except for the following points. In each of the bottles 200B to 200D, the circular wall constructs the key member by a combination of at least one kinds of a rib and a groove, or a combination of at least two kinds of the rib and the groove. Here, the combinations of the rib and the groove are mutually different among the bottles 200A to 200D. The three-dimensional shapes of the respective key members are mutually different among the bottles 200B to 200D, and are also different from the three-dimensional shape of the key member 855. The three-dimensional shape is a shape which is defined by the sizes in the extending direction z2, the radial direction r2 and the circumferential direction θ1. Other than this, the bottles 200B, 200C and 200D are different form the bottle 200A in view of a point that the bottles 200B to 200C store, respectively, the inks of the C color, the M color and the Y color. In the present embodiment, the bottles 200B to 200D are same as the bottle 200A in view of ink capacity (an amount of the ink storable therein). Note that the present disclosure is not limited to or restricted by the above; it is allowable that the bottles 200B to 200D are different from the bottle 200A in view of the ink capacity.

[Bottle Cap 9]

Figure 10A:
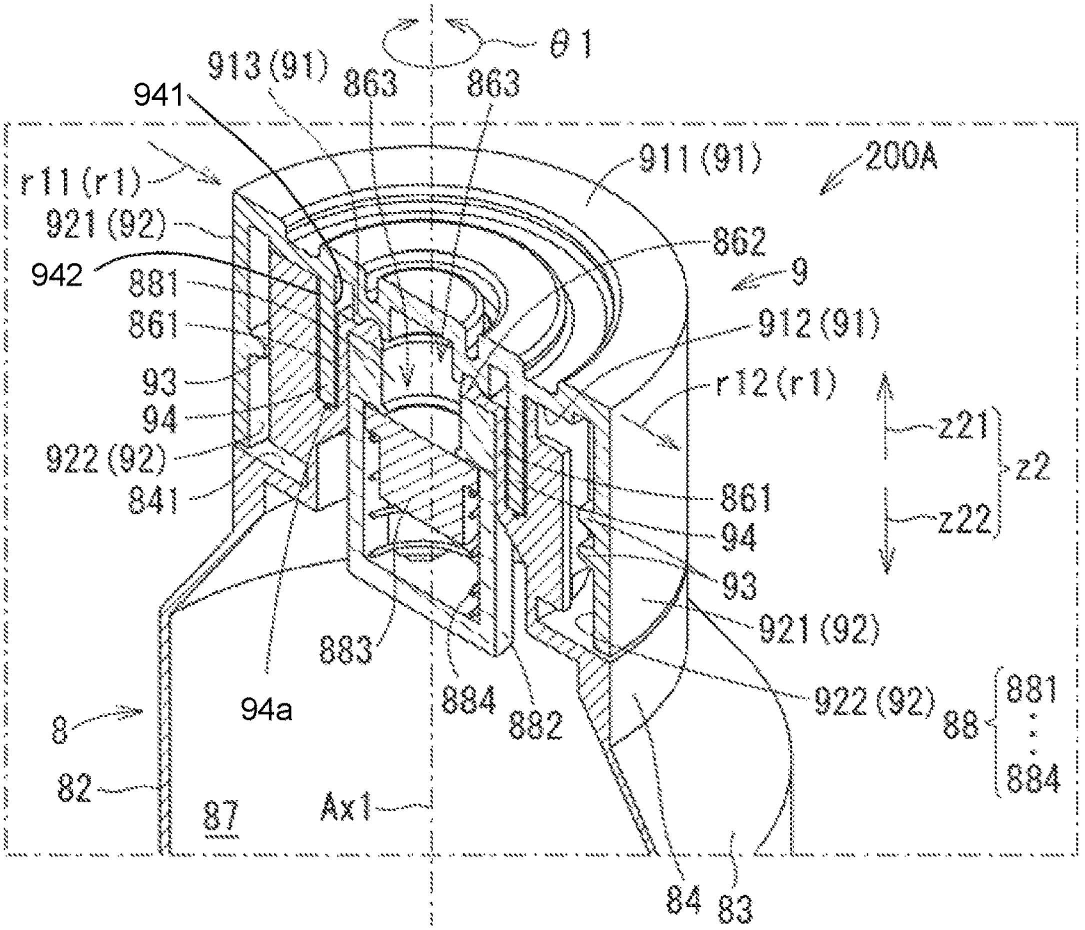
FIG. 10A is a vertical cross-sectional view of a bottle cap along a one dot-chain line D-D' of FIG. 5B.

As apparent from FIG. 5B and FIG. 10A, the bottle cap 9 is a single member, and is attachable and detachable with respect to the bottle body 8. In the following, unless specifically noted, the term "bottle cap 9" means the bottle cap 9 attached to the bottle body 8. In FIG. 10A, the bottle cap 9 is provided with a ceiling wall 91, a side wall 92, a female screw 93 and a circular projecting piece 94. The ceiling wall 91 is an example of a "sealing part", and the circular projecting piece 94 is an example of a "projecting piece".

[Ceiling Wall 91, Side Wall 92, Female Screw 93]

In FIG. 10A, the ceiling wall 91 is a wall having a substantially disc-shape which is coaxial with the axis Ax1, and has two main surfaces which are an outer main surface 911 and an inner main surface 912 which are apart from each other in the extending direction z2. The inner main surface 912 is positioned in the approaching orientation z22 with respect to the outer main surface 911. An engaging part 813 projects, in the inner main surface 912 of the ceiling wall 91, in the approaching orientation z22 at a location close to the axis Ax1. The engaging part 913 has a substantially ring shape in the second plan view, and makes tight contact with a location, in the circular wall 862 of the bottle body 8, which is in the vicinity of the circumferential edge of the outflow port 864. With this, in an attached state of the bottle cap 9, the ceiling wall 91 seals the outflow port 864, which in turn prevents the ink inside the containment chamber 87 from flowing out through the outflow port 864.

The side wall 92 is a wall having a substantially cylindrical shape which extends in the approaching orientation z22 from the outer edge of the inner main surface 912, and has an outer circumferential surface 921 and an inner circumferential surface 922 which are apart from each other in the radial direction r1. The inner circumferential surface 922 has a diameter which is greater to some extent than the outer circumferential surface of each of the curved plates 853 and 854. In FIG. 10A, the female screw 93 is formed in the inner circumferential surface 922 and is capable of being screwed (threadedly engaged) with respect to the male screw 814 of the bottle body 8. In a case that the male screw 814 is being screwed with respect to the female screw 93, an end, of the side wall 92, in the approaching orientation z22 makes contact with the upper surface 841 of the base part 84, in the entire circumference thereof. A state that the end of the side wall 92 makes contact with the upper surface 841 is the attached state in which the bottle cap 9 is attached to the bottle body 8. By allowing the female screw 93 of the bottle cap 9 to be screwed with respect to the male screw 814 formed in the bottle body 8, the bottle cap 9 is attached to the bottle body 8 easily and in an ensured manner. Further, even in a case that the bottle 200A is dropped, the bottle cap 9 is less likely to be detached from the bottle body 8.

The circular projecting piece 94 is a wall having a substantially cylindrical shape and extending, in the inner main surface 912, in the approaching orientation z22 from a position which is in the centrifugal orientation r12 with respect to the engaging part 913 and which is in the centripetal orientation r11 with respect to the side wall 92, and has an inner circumferential surface 941 and an outer circumferential surface 942. The inner circumferential surface 941 is substantially coaxial with the outer circumferential surface of the side wall 861 in the neck part 86. The thickness of the circular projecting piece 94 is a size in the radial direction r1 between the inner circumferential surface 941 and the outer circumferential surface 942. This thickness is substantially constant over the entire circumference in the circumferential direction θ1, and is smaller slightly than the above-described minimum width W11. In the attached state of the bottle cap 9, the circular projecting piece 94 makes contact with the outer circumferential surface of the side wall 861 of the neck part 86 in the bottle body 8 in the centripetal orientation r11, and is fitted between the side wall 861 and the circular wall 85.

In a process of screwing the male screw 814 with the female screw 83 (hereinafter also referred to as a "screwing process"), the inner circumferential surface 941 slidably moves on the outer circumferential surface of the side wall 861 of the neck part 86, while rotating about the axis Ax1. After the screwing process, an end 94*a* in the approaching orientation z22 (namely, an extending end) of the circular projecting piece 94 makes contact with the seat surface 865A over the entire circumference thereof. By the contact between the end 94*a* and the seat surface 865A, an end position at which the bottle cap 9 is screwed with respect to the bottle body 8 is determined, and the screwing of the bottle cap 9 is stopped in the extending direction z2. The size in the extending direction z2 of the circular projecting piece 94 is previously determined so that the end 94*a* makes contact with the seat surface 865A in the attached state.

Figure 10B:
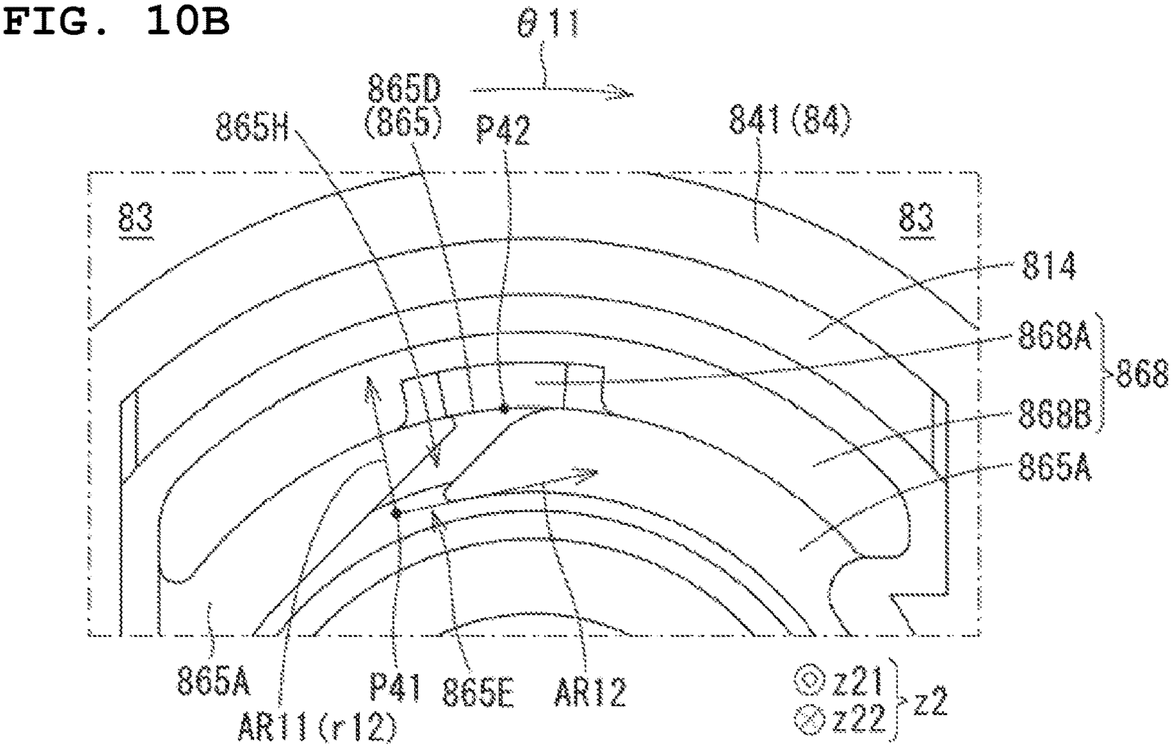
FIG. 10B is a schematic view depicting a detailed shape of an inclined groove.

In FIG. 10B, an orientation of rotation of the bottle cap 9 in the screwing process is indicated by an arrow, as an attaching orientation θ11. A representative position of a part in which the inclined groove 865H crosses the circular groove 865E is referred to as an inner end position P41. A representative position of a part in which the inclined groove 865H crosses the outer circumferential surface 865D of the neck part 86 is referred to as an outer end position P42. Further, the centrifugal orientation r12 with the inner end position P41 as the starting point thereof is indicated by an arrow AR11, and the tangent in the attaching orientation θ11 with the inner end position P41 as the starting position thereof is indicated by an arrow AR12. The inclined groove 865H extends from the inner end position P41 and reaches the outer end position P42 while passing between the arrows AR11 and AR12. With this configuration, in a case that an ink droplet is present, in the circular groove 854E, on the upstream side in the attaching orientation θ11 with respect to the inner end position P41, the end 94*a* guides the ink droplet to the circular groove 865E by the rotation in the attaching orientation θ11. The guided ink droplet is efficiently discharged or exhausted from the circular groove 865E to the trench part 868 via the inclined groove 865H.

Note that the inclined groove 865H may extend to reach the outer end position P42 from the inner end position P41, without passing between the arrows AR11 and AR12.

[Replenishment of Tank 4A with Ink from Bottle 200A]

In a case that the tank 4A is replenished with the ink inside the bottle 200A, an operator moves the casing cover 2 in the MFP 100 from the shielding position P11 to the exposing position P12 (see FIGS. 1A and 1B), moves the tank cover 52A from the covering position P31 (see FIG. 1B) to the exposing position P32 (see FIG. 3A), and moves the cap 6A from the closing position P21 (see FIG. 3A) to the opening position P22 (see FIG. 5A). The operator detaches the bottle cap 9 in the bottle 200A from the bottle body 8 (see FIGS. 5B, 6A).

Figure 11A:
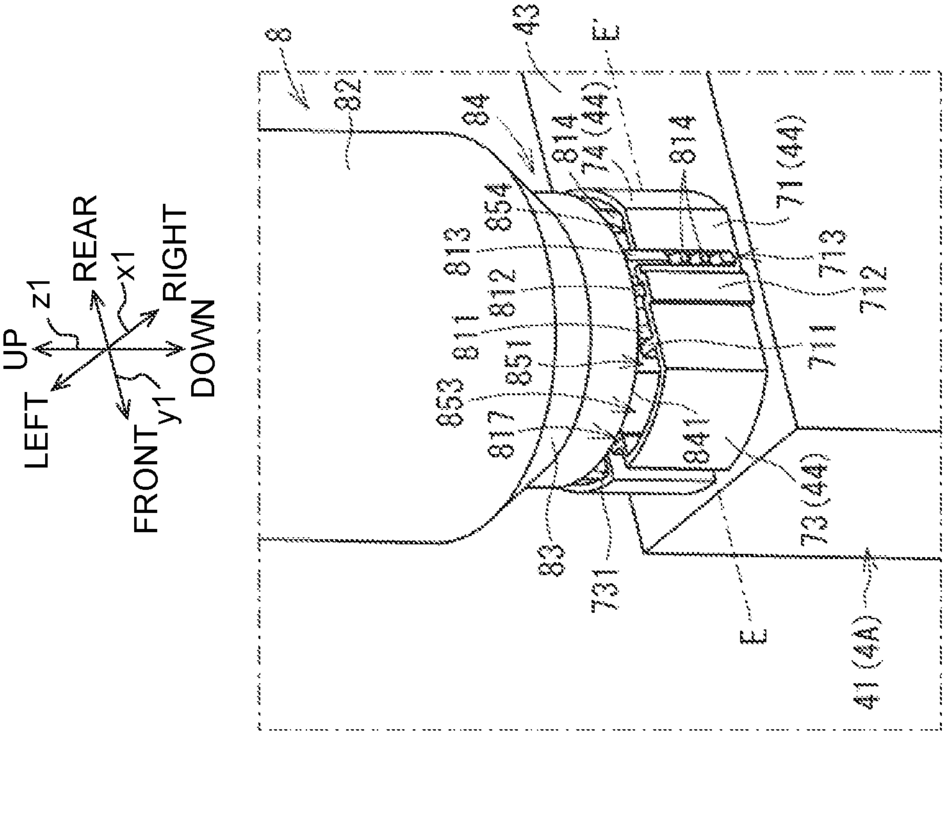
FIG. 11A is a perspective view of a tank to which the bottle body is connected.
Figure 11B:
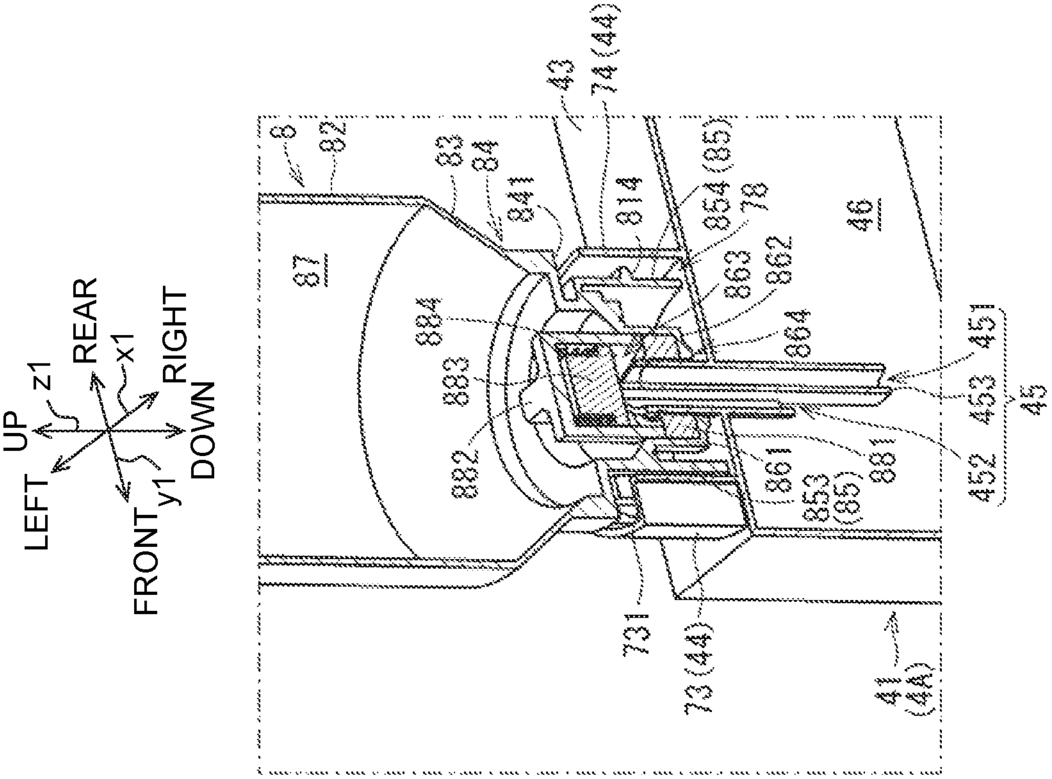
FIG. 11B is a vertical cross-sectional view, along a one-dot chain line E-E' of FIG. 11A, of the bottle body and the tank as seen from the right side thereof.

Next, as understood from FIGS. 11A and 11B, the operator turns the outflow port 864 of the bottle 200A to be oriented downward and causes the key member 855 to approach closely to the key hole 78 provided on the MFP 100. Even in a case that the outflow port 864 is oriented downward, the valve body 883 makes tight contact with the rubber part 881 by the urging force of the coil spring 884, and thus the ink inside the containment chamber 87 does not leak out to the outside of the bottle 200.

Next, the operator positions the key member 855 with respect to the key hole 78. By the positioning, the lower end of the groove 817 is positioned immediately above the upper end of the projecting part 731, the lower end of the rib 811 is positioned immediately above the upper end of the rib 711, the lower end of the rib 812 is positioned immediately above the upper end of the rib 712, and the lower end of the rib 813 is positioned immediately above the upper end of the slit 713. The lower end of the rib 815 is positioned immediately above the upper end of the slit 721, and the lower end of the groove 816 is positioned immediately above the upper end of the rib 722. The operator further makes the outflow port 864 of the bottle 200A to be positioned immediately above the upper end of the needle 45 of the tank 4A. Here, the planar shape of each of the circular walls 44 and 85 is not circular or equilateral. Therefore, the operator easily positions the key member 855 with respect to the key hole 78. Specifically, the fitting between the circular wall 44 of the tank 4A and the circular wall 85 of the bottle body 8 is possible only at two positions wherein the rotational positions, respectively, in the axis Ax1 of the bottle body 8 with respect to the tank 4A are different by 180 degrees.

After completing the positioning, the operator moves the key member 855 of the bottle 200A downward, in the inside of the key hole 78. Specifically, the groove 817 is inserted into the projecting part 731, and the groove 817 moves downward along the projecting part 731. The rib 811 moves downward along the rear surface of the rib 711. The rib 812, the rib 813 and the rib 815 are inserted, respectively, into the groove 712, the slit 713 and the slit 721, and move downward, respectively, along the groove 712, the slit 713 and the slit 721. The groove 816 is inserted into the rib 722 and moves downward along the rib 722.

In a process that the key member 855 moves downward inside the key hole 78, the upper end of the needle 45 makes contact with the lower end of the valve body 833, and then the valve body 883 starts moving upward against the urging force of the coil spring 884, by a contact force received by the valve body 883 from the upper end of the partition wall 453 of the needle 45. In accordance with the reaching of the lower end of the neck part 86 to the bottom surface of the key hole 78, the key member 855 of the bottle body 8 is fitted into the key hole 78 of the tank 4A, thereby completing the connection of the bottle body 8 to the tank 4A. In this situation, even if the operator removes his or her hand(s) from the bottle body 8, the bottle body 8 is supported by the bottom surface of the key hole 78 and the circular wall 85 and is turned upside down, as depicted in FIGS. 11A and 11B. At the time of completion of the connection, the valve body 883 releases the channel 863 by the contact force from the partition wall 453. Since the forward end of the partition wall 453 projects further upward than the upper end of each of the channels 451 and 452, gaps are defined, respectively, between the valve body 883 and the channel 451 and between the valve body 883 and the channel 452. Owing to these gaps, the containment chamber 87 of the bottle body 8 and the containment chamber 46 of the tank 4 communicate with each other via the channels 451, 452 and 863.

Since immediately after the completion of connection, gas-liquid replacement starts between the bottle 200A and the tank 4A. In the gas-liquid replacement, the ink inside the containment chamber 87 flows into the containment chamber 46 via the channels 863 and 451. In the gas-liquid replacement, air flows from the atmosphere communicating hole of the tank 4A into the containment chamber 46, and this air flows into the containment chamber 87 via the channels 452 and 863. An outflow amount of the ink from the containment chamber 87 to the containment chamber 46, and an inflow amount of the air from the containment chamber 46 to the containment chamber 87 are substantially same. In a case that the liquid surface of the ink in the containment chamber 46 reaches the lower end of the channel 452 or that the ink inside the containment chamber 87 becomes empty, the gas-liquid replacement is ended. In such a manner, the tank 4A is replenished with the ink inside the bottle 200A.

After the ending of the ink replenishment, the operator pulls the key member 855 and the neck part 86 of the bottle 200A upward from the key hole 78 and the needle 45 of the tank 4A. In a process in which the neck part 86 is (being) moved upward with respect to the needle 45, the valve body 883 first maintains a state that the valve body 883 makes contact with the upper end of the partition wall 453 of the needle 45 by the urging force of the coil spring 884. After the valve body 883 makes contact with the circular wall 862 of the neck part 86, the valve body 883 is apart from the upper end of the partition wall 453.

Afterward, the operator attaches the bottle cap 9 in the bottle 200A to the bottle body 8 (see FIGS. 5B and 6A). The operator moves the cap 6A from the opening position P22 (see FIG. 5A) to the closing position P21 (see FIG. 3A), moves the tank cover 52A from the exposing position P32 (see FIG. 3A) to the covering position P31 (see FIG. 1B), and moves the casing cover 2 in the MFP 100 from the exposing position P12 to the shielding position P11 (see FIGS. 1A, 1B).

[Prevention of Erroneous Connection of Bottles 200B to 200D to Tank 4A]

In a presumed case that the operator attempts to erroneously fit any one of the bottles 200B to 200D to the key hole 78 of the tank 4A, the shape and/or the position in the left-right direction x1 and/or the front-rear direction y1 of at least one of the projecting parts 731, the rib 711, the groove 712, the slit 713, the slit 721 and the rib 722 constructing the key hole 78 does or do not match the key member of each of the bottles 200B to 200D which is wrong (not matching) with respect to the tank 4A, in some cases. Owing to this, the operator can quickly recognize that the operator is attempting to fit any one of the bottles 200B to 200D erroneously to the tank 4A. Further, it is also possible to quickly prevent the tank 4A from being replenished with an ink which is wrong with respect to the tank 4A.

Furthermore, after the positioning, in such a case that the operator attempts to erroneously fit any one of the bottles 200B to 200D to the key hole 78 of the tank 4A, the shape and/or the position in the up-down direction z1 of at least one of the projecting parts 731, the rib 711, the groove 712, the slit 713, the slit 721 and the rib 722 constructing the key hole 78 does or do not match the key member of each of the bottles 200B to 200D which is wrong (not matching) with respect to the tank 4A, in some cases. In this case, since any one of the bottles 200B to 200D does not move downward, the operator can quickly recognize that the operator is attempting to fit any one of the bottles 200B to 200D erroneously to the tank 4A. Moreover, it is also possible to prevent the tank 4A from being replenished with an ink which is wrong with respect to the tank 4A.

[Effects of Embodiment]

Since the outflow port 864 of the bottle body 8 is turned downward during the process of ink replenishment, the ink adhered to the vicinity of the outflow port 864 easily drips down from the neck port 86. However, the forward end of the circular wall 85 is located above the forward end of the neck part 86 in the placement posture, and thus even in a case that the orientation of the outflow port 864 is changed and that the ink adhered to the vicinity of the outflow port 864 drips down from the neck part 86, the ink is easily made to drip down in the inside of the circular wall 85. As a result, the surrounding of the bottle 200A is less likely to be stained or dirtied by the ink. Further, in a case, for example, that the bottle body 8 is dropped down from the desk, etc., the circular wall 85 collides against the floor, etc., faster than the neck part 86, and thus the neck part 86 can be protected from the impact.

In the process of attaching the bottle cap 9, after the circular projecting piece 94 is fitted to the surrounding of the circular wall 86 of the neck part 86, the circular projecting piece 94 slidably moves on the outer circumferential surface of the side wall 861 of the neck part 86 during a period of time until the side wall 92 of the bottle cap 9 abuts against the upper surface 841 of the base part 84. Accordingly, any unsatisfactory threading (screwing) between the male screw 814 and the female screw 93 is less likely to occur, which in turn allows the bottle cap 9 to be easily attached to the bottle body 8.

After the bottle cap 9 is detached from the bottle body 8 every time the tank 4A is replenished with the ink, the bottle cap 9 is placed on the table, etc. In this situation, in a case that the ink adheres to the circular projecting pieces 94, there is such a fear that the ink might drip down to the desk, etc. In the present embodiment, however, the circular projecting piece 94 makes contact with the seat surface 865A in the attached state (as described above), and the circular projecting piece 94 slidable moves in the circumferential direction θ1 on the seat surface 865A during the process wherein the bottle cap 9 is (being) detached. Further, since the circular groove 865E and the inclined grooves 865F to 865H are formed in the seat surface 865A, the ink adhered to the circular projecting piece 94 is guided to the inclined grooves 865F to 865H. This ink flows in the inside of the inclined grooves 865F to 865H and flows down to the trench parts 866 to 868, due to the adhesion force of the inclined grooves 865F to 865H and/or the gravity. Here, since the bottom surface of each of the inclined grooves 865F to 865H is inclined downward, the ink is more likely to flow to the trench parts 866 to 868. Accordingly, the ink is less likely to be held or less likely to remain on the seat surface 865A, and an ink droplet is less likely to adhere to the circular projecting piece 94 in the case that the bottle cap 9 is being detached from the bottle body 8. As a result, even in a case that the detached bottle cap 9 is placed on the table, etc., the ink droplet is less likely to drip down to the desk, etc.

The circular wall 44 is constructed by the combination of the connecting plates 71 and 72 and the curved plates 73 and 74, and the circular wall 85 is constructed of the combination of the connecting plates 851 and 852 and the curved plates 853 and 854. Accordingly, the operator is capable of easily positioning the key member 855 with respect to the key hole 78 in a case of the ink replenishment. Further, the number, the three-dimensional position and the three-dimensional shape of the projecting part, rib, groove and slit constructing each of the key member 855 and the key hole 78 can be changed per each of the bottles 200A to 200D. Accordingly, the operator can grasp the kind of the bottles 200A to 200D from the shape of the key member 855.

It is assumed that the bottle 200A topples sideways, from the placement posture, in a state that the ink remains in the trench parts 866 and 867. As depicted in FIG. 8, however, each of the inclined grooves 865F and 865G is formed in the second area 865R, and the inclined groove 865H is formed in the second area 865S. The outer end of each of the inclined grooves 865F, 865G and 865H is provided on a location which is apart, in the circumferential direction θ1, from the end in the circumferential direction θ1 of one of the trench parts 866, 867 and 868 wherein the ink easily remains in a case that the bottle 200A topples sideways. Accordingly, in the case that the bottle 200A topples sideways, the ink is less likely to enter into the inclined grooves 865F, 865G and 865F from the outer ends of the inclined grooves 865F, 865G and 865H, respectively. As a result, the ink is less likely to flow backward (turn back) to the seat surface 865A, and the ink is less likely to adhere to the bottle cap 9.

The outer end of the inclined groove 865F is located at the position in the separating orientation z21 from the deep part 866B in the trench part 866. Accordingly, it is possible to make the distance between the outer end of the inclined groove 865F and the bottom part of the trench part 866 to be longer, as compared with a case that outer end of the inclined groove 865F is located at the position in the separating orientation z21 from the shallow part 866A in the trench part 866. Therefore, even in a case that the bottle 200A is inclined or topples sideways from the placement posture, the ink is less likely to reach the outer end of the inclined surface 865F. This is similarly applicable also to the inclined groove 865G. As a result, the ink is less likely to flow backward (turn back) to the seat surface 865A, and the ink is less likely to adhere to the bottle cap 9.

Each of the parts 866A and 867A functions, respectively, as the rib partitioning the space defined by one of the trench parts 866 and 867 into a plurality of small spaces. Accordingly, in a case for example that the bottle 200A topples sideways in a state that the ink remains in the trenched part 866, the ink remains in the lower end of each of the small spaces in the trench part 866, and thus the ink is less likely to reach the seat surface 866A and the ink is less likely to adhere to the bottle cap 9. Provided that the part 866A is not provided on the trench part 866, in a case that the bottle 200A topples sideways, all the ink are collected in the lower end of the trench part 866, and thus the ink is likely to reach the seat surface 865A and the ink is likely to adhere to the bottle cap 9. This is similarly applicable also to the trench part 867.

While the teaching has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the teaching, and not limiting the teaching. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described teaching are provided below:

[Other Modifications]

In the embodiment, the four color inks are contained in the tanks 4A to 4D, respectively, as described above. It is allowable, however, that a pre-processing liquid (another example of the "liquid") which is discharged or ejected by the recording head 322 onto a sheet S, etc., prior to the discharge of the ink in the image recording. Other than this, it is allowable that the tanks 4A to 4D store water (yet another example of the "liquid") which is used for cleaning or washing the recording head 322.

In the embodiment, the printer part 3 is capable of recording a full color image on the sheet S. The present disclosure, however, is not limited to or restricted by this; the printer part 3 may be capable of recording only a monochrome image on the sheet S. In such a case, the tank set 31 is provided with the tank 4A, the holding member 51A, the cap 6A and the tank cover 52A.

In the embodiment, the key hole 78 is provided on the tank 4A. The present disclosure, however, is not limited to this; the key hole 78 may be formed in the inner circumferential surface of the through hole 511A of the holding member 51A.

In the embodiment, the three-dimensional shape of each of the key member 855 and the key hole 78 is made to be mutually different per each of the colors of the inks. The present disclosure, however, is not limited to this; the three-dimensional shape of each of the key member 855 and the key hole 78 is made to be mutually different per each kind (namely, each model) of the MFP 100.

What is claimed is:

1. A liquid containment bottle comprising a bottle body defining an internal space configured to contain liquid, wherein the bottle body has:
- an upper surface;
- a nozzle having a forward end surface, the nozzle projecting upward from the upper surface, the nozzle having an opening formed in the forward end surface; and
- a surrounding wall which projects upward from the upper surface, and which is continuous to surround an entire circumference of the forward end surface of the nozzle,
- an upper end of the surrounding wall is positioned above the forward end surface,
- an outer circumferential surface of the surrounding wall includes a curved surface curved along a circumferential direction of the surrounding wall and a plane surface, the surrounding wall has:
- a groove recessed from the curved surface in a radial direction of the surrounding wall; and
- a rib extended from the groove in the radial direction of the surrounding wall, and
- an upper end of the rib is positioned below the upper end of the surrounding wall,
- the groove has a bottom surface projecting upward from the upper surface and extending parallel to the circumferential direction of the surrounding wall, and a first side surface and a second side surface spaced apart from one another and extending from the bottom surface in the radial direction of the surrounding wall, and wherein the rib extends from the first side surface towards the second side surface in the circumferential direction of the surrounding wall.

2. The liquid containment bottle according to claim 1, wherein
- the liquid containment bottle is configured to supply the liquid to a tank of a liquid consuming apparatus,
- the liquid containment bottle further comprises a key member which is formed in the surrounding wall, and
- the key member is configured to conform to a receiver key member provided on a surrounding of a supply port of the tank.

3. The liquid containment bottle according to claim 1, further comprising a cap configured to be attached to the bottle body, wherein
- the nozzle has:
  - a seat surface located at a position which is closer to the surrounding wall than the forward end surface in a radial direction of the nozzle, and which is closer to the internal space than the forward end surface in an up-down direction; and a groove which is formed in the seat surface and which has an end part connected to a space between the nozzle and the surrounding wall, and the cap has:

a sealing part configured to seal the opening in an attached state in which the cap is attached to the bottle body; and a projecting piece which projects from a surrounding of the sealing part and which is configured to make contact with the seat surface in the attached state.

4. The liquid containment bottle according to claim 3, wherein the nozzle has a nozzle upper part which is positioned above the seat surface and which has a cylindrical shape, the seat surface has a ring shape and is oriented upward, and the projecting piece has a cylindrical shape.

5. A liquid containment bottle comprising a bottle body defining an internal space configured to contain liquid, wherein the bottle body has:

an upper surface;

a nozzle having a forward end surface, the nozzle projecting upward from the upper surface, the nozzle having an opening formed in the forward end surface; and a surrounding wall which projects upward from the upper surface, and which is continuous to surround an entire circumference of the forward end surface of the nozzle, an upper end of the surrounding wall is positioned above the forward end surface, an outer circumferential surface of the surrounding wall includes a curved surface curved along a circumferential direction of the surrounding wall and a plane surface, the surrounding wall has:

a groove recessed from the curved surface in a radial direction of the surrounding wall; and a rib extended from the groove in the radial direction of the surrounding wall, an upper end of the rib is positioned below the upper end of the surrounding wall, and the groove includes a bottom surface projecting upward from the upper surface and extending parallel to the circumferential direction of the surrounding wall, and a first side surface and a second side surface spaced apart from one another and extending from the bottom surface in the radial direction of the surrounding wall, and wherein the rib extends from the first side surface towards the second side surface in the circumferential direction of the surrounding wall, the liquid containment bottle further comprising a cap configured to be attached to the bottle body, wherein the nozzle has:

a seat surface located at a position which is closer to the surrounding wall than the forward end surface in a radial direction of the nozzle, and which is closer to the internal space than the forward end surface in an up-down direction; and an inclined groove which is formed in the seat surface and which has an end part connected to a space between the nozzle and the surrounding wall, and the cap has:

a sealing part configured to seal the opening in an attached state in which the cap is attached to the bottle body; and a projecting piece which projects from a surrounding of the sealing part and which is configured to make contact with the seat surface in the attached state; and wherein the inclined groove has a bottom surface which is inclined downward toward the internal space.

6. The liquid containment bottle according to claim 3, wherein the cap is configured to be screwed with respect to the surrounding wall and to be attached to the bottle body.

7. A liquid supply apparatus comprising:

the liquid containment bottle as defined in claim 1; and a tank having a containment chamber configured to contain the liquid, wherein the tank has:

a recessed part; and a communicating tube which is positioned in the recessed part, the communicating tube has a first channel and a second channel which are configured to communicate between the containment chamber and outside, and the surrounding wall is configured to be inserted into the recessed part and the communicating tube is configured to be inserted into the opening of the nozzle, to thereby connect the bottle body to the tank and to allow the liquid to flow out from the internal space of the bottle body to the containment chamber of the tank.

* * * * *